(12) United States Patent
Kamimura

(10) Patent No.: US 12,188,901 B2
(45) Date of Patent: Jan. 7, 2025

(54) MANAGEMENT METHOD, MEASURING METHOD, MEASURING DEVICE, CRYSTAL OSCILLATOR SENSOR, AND SET

(71) Applicant: FUJIFILM Corporation, Tokyo (JP)

(72) Inventor: Tetsuya Kamimura, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 192 days.

(21) Appl. No.: 17/848,410

(22) Filed: Jun. 24, 2022

(65) Prior Publication Data
US 2022/0326184 A1 Oct. 13, 2022

Related U.S. Application Data

(63) Continuation of application No. PCT/JP2020/045451, filed on Dec. 7, 2020.

(30) Foreign Application Priority Data

Dec. 27, 2019 (JP) .................. 2019-237725

(51) Int. Cl.
*G01N 29/036* (2006.01)
*G01N 1/14* (2006.01)
(Continued)

(52) U.S. Cl.
CPC .............. *G01N 29/036* (2013.01); *G01N 1/14* (2013.01); *G01N 1/405* (2013.01); *G01N 5/02* (2013.01);
(Continued)

(58) Field of Classification Search
CPC ........ G01N 29/036; G01N 1/14; G01N 1/405; G01N 5/02; G01N 29/022; G01N 29/4409;
(Continued)

(56) References Cited

U.S. PATENT DOCUMENTS 4,789,804 A * 12/1988 Karube ............ G01N 33/54373
73/61.79
11,256,173 B2 2/2022 Kamimura et al.
(Continued)

FOREIGN PATENT DOCUMENTS

CN 110312936 10/2019
JP H04116455 * 4/1992 ............. G01N 27/22
(Continued)

OTHER PUBLICATIONS

"International Search Report (Form PCT/ISA/210) of PCT/JP2020/045451," mailed on Feb. 22, 2021, with English translation thereof, pp. 1-6.
(Continued)

*Primary Examiner* — Benjamin R Schmitt
(74) *Attorney, Agent, or Firm* — JCIPRNET

(57) ABSTRACT

A management method of managing a purity of a chemical liquid containing an organic solvent by sensing impurities in the chemical liquid. The management method includes Step 1 of preparing a target chemical liquid containing an organic solvent; Step 2 of bringing the target chemical liquid into contact with a crystal oscillator sensor including an adsorption layer that adsorbs the impurities and a crystal oscillator and obtaining an amount of change in a resonance frequency of the crystal oscillator resulting from contact of the target chemical liquid; and Step 3 of managing the purity of the chemical liquid by comparing whether or not the obtained amount of change falls within a permissible range based on a preset purity of the target chemical liquid. In Step 2, at least a part of a liquid contact portion coming into contact with the target chemical liquid is made of a fluorine-based resin.

34 Claims, 5 Drawing Sheets

(51) Int. Cl.
*G01N 1/40* (2006.01)
*G01N 5/02* (2006.01)
*G01N 29/02* (2006.01)
*G01N 29/44* (2006.01)

(52) U.S. Cl.
CPC ....... *G01N 29/022* (2013.01); *G01N 29/4409* (2013.01); *G01N 29/4427* (2013.01); *G01N 2291/014* (2013.01); *G01N 2291/022* (2013.01); *G01N 2291/0256* (2013.01); *G01N 2291/02809* (2013.01); *G01N 2291/0426* (2013.01)

(58) Field of Classification Search
CPC ......... G01N 29/4427; G01N 2291/014; G01N 2291/022; G01N 2291/0256; G01N 2291/02809; G01N 2291/0426
See application file for complete search history.

(56) References Cited

U.S. PATENT DOCUMENTS

| | | |
|---|---|---|
| 2002/0178787 A1 | 12/2002 | Matsiev et al. |
| 2004/0051595 A1* | 3/2004 | Yoshimine ............... H03B 5/36 331/158 |
| 2011/0048114 A1* | 3/2011 | Tsortos ............ G01N 33/54373 73/64.53 |
| 2014/0004529 A1* | 1/2014 | Shinobu ............... G01N 29/022 435/7.1 |
| 2019/0346764 A1 | 11/2019 | Kamimura |
| 2020/0033291 A1 | 1/2020 | Tarasov et al. |
| 2022/0121123 A1 | 4/2022 | Kamimura et al. |

FOREIGN PATENT DOCUMENTS

| | | |
|---|---|---|
| JP | H0618394 | 1/1994 |
| JP | H06194290 | 7/1994 |
| JP | 2007263564 | 10/2007 |
| JP | 2011237295 | 11/2011 |
| JP | 2013088160 | 5/2013 |
| JP | 2020159784 | 10/2020 |
| KR | 20190100355 | 8/2019 |
| WO | 2016104433 | 6/2016 |
| WO | 2017169834 | 10/2017 |

OTHER PUBLICATIONS

"Written Opinion of the International Searching Authority (Form PCT/ISA/237)" of PCT/JP2020/045451, mailed on Feb. 22, 2021, with English translation thereof, pp. 1-10.

"Office Action of Taiwan Counterpart Application", issued on Apr. 19, 2024, with English translation thereof, p. 1-p. 16.

"Office Action of Japan Counterpart Application", issued on Nov. 5, 2024, with English translation thereof, p. 1-p. 8.

"Notice of Reasons for Refusal of Japan Counterpart Application No. 2023-179053", issued on Nov. 5, 2024, with English translation thereof, p. 1-p. 8.

"Office Action of Korea Counterpart Application", issued on Oct. 23, 2024, with English translation thereof, p. 1-p. 11.

* cited by examiner

MANAGEMENT METHOD, MEASURING METHOD, MEASURING DEVICE, CRYSTAL OSCILLATOR SENSOR, AND SET

CROSS-REFERENCE TO RELATED APPLICATIONS

This application is a Continuation of PCT International Application No. PCT/JP2020/045451 filed on Dec. 7, 2020, which claims priority under 35 U.S.C. § 119(a) to Japanese Patent Application No. 2019-237725 filed on Dec. 27, 2019. Each of the above applications is hereby expressly incorporated by reference, in its entirety, into the present application.

BACKGROUND OF THE INVENTION

1. Field of the Invention

The present invention relates to a management method, a measuring method, a measuring device, a crystal oscillator sensor, and a set.

2. Description of the Related Art

A semiconductor device manufacturing process includes various steps such as a lithography step, an etching step, an ion implantation step, and a peeling step. Various chemical liquids such as a developing liquid, a rinsing liquid, a pre-wet liquid, and a peeling liquid used in such a semiconductor device manufacturing process are required to have high purity.

As one of the methods of evaluating the characteristics of a high-purity chemical liquid, there is a method of applying a high-purity chemical liquid on a substrate and measuring the number of defects on the substrate to evaluate the characteristics of the chemical liquid.

For example, in Patent Document 1, the above evaluation is performed using a surface inspection device (SP-5; made by KLA Tencor).

SUMMARY OF THE INVENTION

Meanwhile, the measurement using the surface inspection device (SP-5; made by KLA Tencor) described in Patent Document 1 has a complicated measurement procedure itself, a long working time, and lacks general-purpose properties.

For that reason, it is not preferable from an industrial point of view to perform the above measurement and measure the purity of the chemical liquid whenever the chemical liquid is produced, and a method of managing the purity of the chemical liquid to be produced more easily is required.

In view of the above circumstances, an object of the present invention is to provide a management method of managing the purity of a chemical liquid containing an organic solvent more easily.

Additionally, an object of the present invention is to provide a measuring method, a measuring device, a crystal oscillator sensor, and a set.

As a result of diligent studies, the present inventors have found that the above objects can be achieved by the following configurations.

(1) A management method of managing a purity of a chemical liquid containing an organic solvent by sensing impurities in the chemical liquid, the management method comprising:

Step 1 of preparing a target chemical liquid containing an organic solvent;

Step 2 of bringing the target chemical liquid into contact with a crystal oscillator sensor including an adsorption layer that adsorbs the impurities and a crystal oscillator and obtaining an amount of change in a resonance frequency of the crystal oscillator resulting from contact of the target chemical liquid; and Step 3 of managing the purity of the chemical liquid by comparing whether or not the obtained amount of change in the resonance frequency falls within a permissible range of the amount of change in the resonance frequency based on a preset purity of the target chemical liquid, in which in Step 2, at least a part of a liquid contact portion coming into contact with the target chemical liquid is made of a fluorine-based resin.

(2) The management method according to (1) in which the target chemical liquid is fed to the crystal oscillator sensor to bring the target chemical liquid into contact with the crystal oscillator sensor.

(3) The management method according to (1) or (2) in which the target chemical liquid is allowed to flow in one direction through the crystal oscillator sensor to bring the target chemical liquid into contact with the crystal oscillator sensor.

(4) The management method according to any one of (1) to (3) in which the target chemical liquid is circulated and supplied to the crystal oscillator sensor, and a circulation flow rate of the target chemical liquid is 0.01 to 1000 ml/s.

(5) The management method according to any one of (1) to (4) in which the adsorption layer is made of at least one material of Si, Au, $SiO_2$, SiOC, Cu, Co, W, Ti, TiN, Ta, TaN, or a photosensitive resin composition.

(6) The measuring method according to any one of (1) to (5) in which the crystal oscillator sensor has a plurality of the adsorption layers, Step 2 is a step of obtaining the amount of change in the resonance frequency for each of the plurality of adsorption layers, and Step 3 is a step of calculating a difference in the amount of change in the resonance frequency of each of the plurality of adsorption layers and managing the purity of the chemical liquid by comparing whether or not the obtained value falls within the permissible range of the amount of change in the resonance frequency based on the preset purity of the target chemical liquid.

(7) The management method according to (6) in which at least one of the plurality of adsorption layers is a Au layer.

(8) A measuring method for a chemical liquid, comprising:

Step 1 of preparing a target chemical liquid containing an organic solvent; and

Step 2 of bringing the target chemical liquid into contact with a crystal oscillator sensor including an adsorption layer that adsorbs impurities in the target chemical liquid and a crystal oscillator and obtaining an amount of change in a resonance frequency of the crystal oscillator resulting from contact of the target chemical liquid, and in which in Step, at least a part of a liquid contact portion coming into contact with the target chemical liquid is made of a fluorine-based resin.

(9) The measuring method according to (8) in which the target chemical liquid is fed to the crystal oscillator sensor to bring the target chemical liquid into contact with the crystal oscillator sensor.

(10) The measuring method according to (8) or (9) in which the target chemical liquid is allowed to flow in one direction through the crystal oscillator sensor to bring the target chemical liquid into contact with the crystal oscillator sensor.

(11) The measuring method according to any one of (8) to (10) in which the target chemical liquid is circulated and supplied to the crystal oscillator sensor, and a circulation flow rate of the target chemical liquid is 0.01 to 1000 ml/s.

(12) The measuring method according to any one of (8) to (11) in which the adsorption layer is made of at least one material of Si, Au, $SiO_2$, SiOC, Cu, Co, W, Ti, TiN, Ta, TaN, or a photosensitive resin composition.

(13) The measuring method according to any one of (8) to (12) in which the crystal oscillator sensor has a plurality of the adsorption layers, and Step 2 is a step of obtaining the amount of change in the resonance frequency for each of the plurality of the adsorption layers.

(14) The measuring method according to (13) in which at least one of the plurality of adsorption layers is an Au layer.

(15) A measuring device that senses impurities in a chemical liquid containing an organic solvent, the measuring device comprising:

a crystal oscillator sensor that is brought into contact with a target chemical liquid containing the organic solvent and includes an adsorption layer that adsorbs the impurities and a crystal oscillator;

an oscillation unit that oscillates the crystal oscillator at a resonance frequency;

a detection unit that is connected to the crystal oscillator sensor and detects the amount of change in the resonance frequency of the crystal oscillator resulting from contact with the target chemical liquid; and a supply unit that supplies the target chemical liquid to the crystal oscillator sensor and brings the target chemical liquid into contact with the crystal oscillator sensor, in which at least a part of a liquid contact portion coming into contact with the target chemical liquid is made of a fluorine-based resin.

(16) The measuring device according to (15), further comprising a display unit that displays the amount of change in the resonance frequency.

(17) The measuring device according to (15) or (16) in which the supply unit allows the target chemical liquid to flow in one direction through the crystal oscillator sensor to supply the target chemical liquid.

(18) The measuring device according to any one of (15) to (17) in which the supply unit circulates and supplies the target chemical liquid to the crystal oscillator sensor, and a circulation flow rate of the target chemical liquid is 0.01 to 1000 ml/s.

(19) The measuring device according to any one of (15) to (18) in which the adsorption layer is made of at least one material of Si, Au, $SiO_2$, SiOC, Cu, Co, W, Ti, TiN, Ta, TaN, or a photosensitive resin composition.

(20) The measuring device according to any one of (15) to (19) in which the crystal oscillator sensor has a plurality of the adsorption layers, and the detection unit detects the amount of change in the resonance frequency for each of the plurality of the adsorption layers.

(21) The measuring device according to (20) in which at least one of the plurality of adsorption layers is a Au layer.

(22) The measuring device according to any one of (15) to (21), further comprising: a seal portion that is disposed on the crystal oscillator sensor;

a block that is disposed on the crystal oscillator sensor via the seal portion and is provided with a supply passage that supplies the target chemical liquid to the crystal oscillator sensor, and a discharge passage that discharges the target chemical liquid from the crystal oscillator sensor; and a liquid feeding unit including a first tube connected to the supply passage and a second tube connected to the discharge passage, in which at least one of a liquid contact portion of the seal portion coming into contact with the target chemical liquid, a liquid contact portion of the block coming into contact with the target chemical liquid, or a liquid contact portion of the liquid feeding unit coming into contact with the target chemical liquid is made of a fluorine-based resin.

(23) The measuring device according to (22) in which the liquid contact portion of the block coming into contact with the target chemical liquid is made of a fluorine-based resin showing a tensile strength of 20 to 60 MPa and a Shore D hardness of 60 to 80.

(24) The measuring device according to (22) or (23) in which the liquid contact portion of the block coming into contact with the target chemical liquid is made of a fluorine-based resin selected from the group consisting of perfluoroalkoxyalkane, an ethylene tetrafluoroethylene copolymer, a perfluoro ethylene propene copolymer, polychlorotrifluoroethylene, and polyvinylidene fluoride.

(25) The measuring device according to (22) in which the liquid contact portion of the liquid feeding unit coming into contact with the target chemical liquid is made of a fluorine-based resin having a repeating unit containing a fluorine atom, a carbon atom, and an atom other than the fluorine atom and the carbon atom.

(26) The measuring device according to (22) or (25) in which the liquid contact portion of the liquid feeding unit coming into contact with the target chemical liquid is made of a fluorine-based resin selected from the group consisting of a ternary copolymer of tetrafluoroethylene, hexafluoropropylene, and vinylidene fluoride, polyvinylidene fluoride, an ethylene tetrafluoroethylene copolymer, and polychlorotrifluoroethylene.

(27) The measuring device according to (22) in which the liquid contact portion of the seal portion coming into contact with the target chemical liquid is made of a fluorine-based resin showing a tensile strength of 20 to 40 MPa, a Shore D hardness of 56 to 70, and a bending modulus of 0.5 to 3 GPa.

(28) The measuring device according to (22) or (27) in which the liquid contact portion of the seal portion coming into contact with the target chemical liquid is made of a fluorine-based resin selected from the group consisting of perfluoroalkoxyalkane, a perfluoroethylene propene copolymer, an ethylene chlorotrifluoroethylene copolymer, an ethylene tetrafluoroethylene copolymer, polychlorotrifluoroethylene, and polyvinylidene fluoride.

(29) A crystal oscillator sensor used for the measuring device according to any one of (15) to (28)

comprising: a crystal oscillator; and an adsorption layer disposed on the crystal oscillator, in which the adsorption layer is made of at least one material of Si, Au, $SiO_2$, SiOC, Cu, Co, W, Ti, TiN, Ta, TaN, or a photosensitive resin composition.

(30) The crystal oscillator sensor according to (29) in which at least two adsorption layers are disposed on the crystal oscillator.

(31) The crystal oscillator sensor according to (30) in which at least one of a plurality of the adsorption layers is a Au layer.

(32) A set comprising: a chemical liquid; and an information display unit that displays or stores resonance frequency information of the chemical liquid, in which an amount of change in a resonance frequency of a crystal oscillator resulting from bringing the chemical liquid into contact with a crystal oscillator sensor including an adsorption layer that adsorbs impurities in the chemical liquid and the crystal oscillator is obtained, the obtained amount of change in the resonance frequency is compared with an amount of change in the resonance frequency based on a preset purity of the chemical liquid, an evaluation of the purity of the chemical liquid with respect to the obtained amount of change in the resonance frequency is given, and the obtained amount of change in the resonance frequency and the purity of the chemical liquid, which are based on the evaluation, are associated with each other and recorded as the resonance frequency information of the chemical liquid, and the resonance frequency information of the chemical liquid is used to obtain information on the purity of the chemical liquid.

(33) The set according to (32) in which the set has a container that stores the chemical liquid, and the information display unit is provided in the container.

(34) The set according to (32) or (33) in which the resonance frequency information of the chemical liquid is displayed on the information display unit by using at least one of texts, symbols, or barcodes.

According to the present invention, it is possible to provide the management method of managing the purity of the chemical liquid containing the organic solvent more easily.

Additionally, according to the present invention, it is possible to provide a measuring method, a measuring device, a crystal oscillator sensor, and a set.

DESCRIPTION OF THE PREFERRED EMBODIMENTS

Hereinafter, a management method, a measuring method, a measuring device, a crystal oscillator sensor, and a set of the present invention will be described in detail on the basis of preferred embodiments shown in the accompanying drawings.

In addition, the drawings described below are exemplary for explaining the present invention, and the present invention is not limited to the drawings shown below.

In addition, in the following, "to" indicating a numerical range includes numerical values described on both sides. For example, in a case where $\varepsilon$ is a numerical value $\alpha$ to a numerical value $\beta$, the range of $\varepsilon$ is a range including the numerical value $\alpha$ and the numerical value $\beta$ and is $\alpha \leq \varepsilon \leq \beta$ in mathematical symbols.

[Measuring Device]

Figure 1:
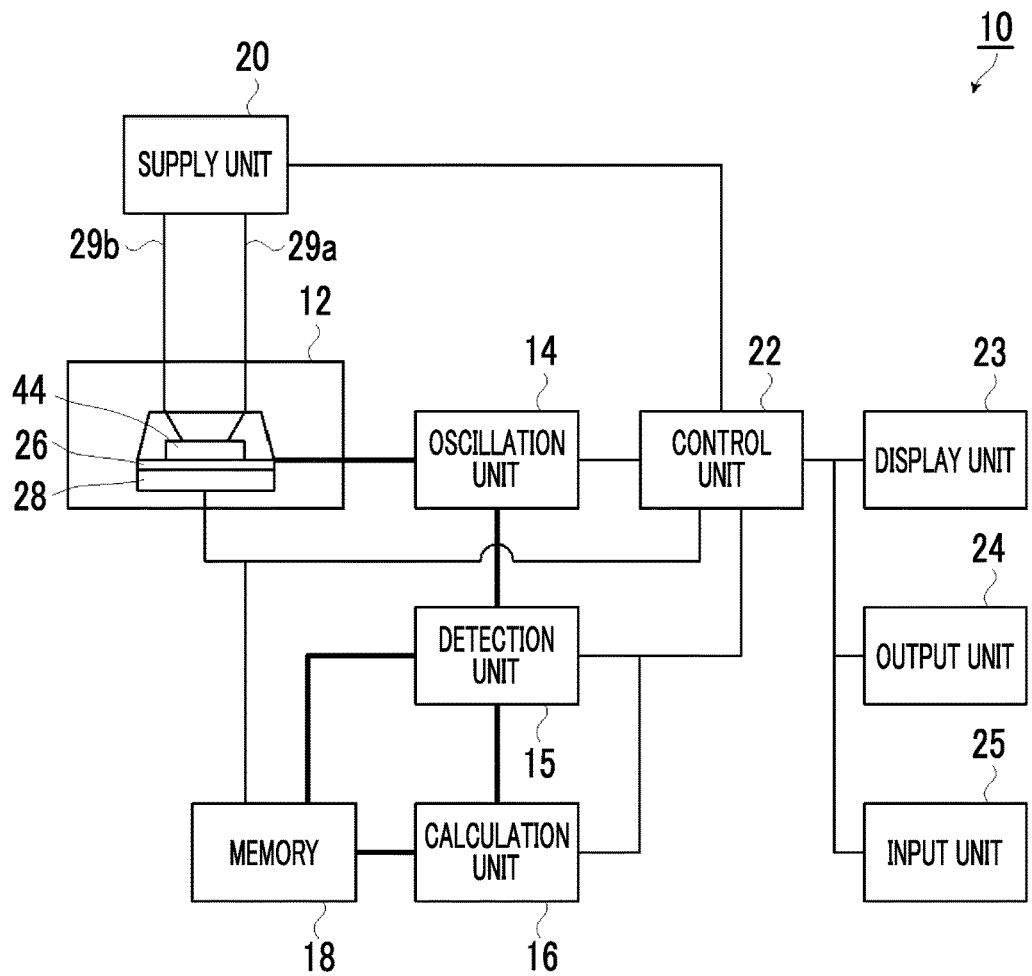
FIG. 1 is a schematic diagram showing an example of a measuring device according to an embodiment of the present invention.
Figure 2:
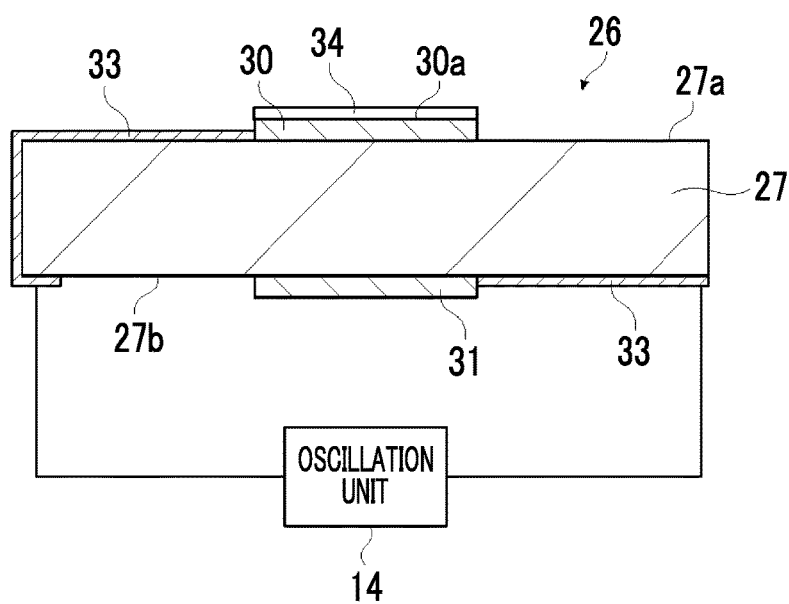
FIG. 2 is a schematic cross-sectional view showing a first example of a crystal oscillator sensor according to the embodiment of the present invention.

FIG. 1 is a schematic diagram showing an example of a measuring device according to an embodiment of the present invention, and FIG. 2 is a schematic cross-sectional view showing a first example of a crystal oscillator sensor according to the embodiment of the present invention.

A measuring device 10 shown in FIG. 1 is a device that senses impurities in a chemical liquid containing an organic solvent. The measuring device 10 can be used to manage the purity of a target chemical liquid.

The measuring device 10 includes a flow cell unit 12, an oscillation unit 14, a detection unit 15, a calculation unit 16, a memory 18, a supply unit 20, and a control unit 22. The measuring device 10 further includes a display unit 23, an output unit 24, and an input unit 25.

The control unit 22 controls the operations of the flow cell unit 12, the oscillation unit 14, the detection unit 15, the calculation unit 16, the memory 18, and the supply unit 20. Additionally, the control unit 22 controls respective components of the measuring device 10 on the basis of the operation control of the display unit 23, the output unit 24, and the input information from the input unit 25.

The flow cell unit 12 has a crystal oscillator sensor 26 including an adsorption layer 34 (refer to FIG. 2) that adsorbs the impurities and a crystal oscillator 27 (refer to FIG. 2), and a temperature adjustment unit 28 for maintaining the temperature of the target chemical liquid supplied to the flow cell unit 12. The flow cell unit 12 will be described in detail below.

The oscillation unit 14 is electrically connected to the crystal oscillator sensor 26. The oscillation unit 14 oscillates the crystal oscillator 27 at a resonance frequency. The oscillation unit 14 applies a high-frequency signal of a sine wave to the crystal oscillator sensor 26 as a frequency signal, and has an oscillation circuit (not shown).

Additionally, the detection unit 15 is electrically connected to the oscillation unit 14. The detection unit 15 measures the resonance frequency of the crystal oscillator 27 and detects the amount of change in the resonance frequency of the crystal oscillator resulting from contact with the target chemical liquid. In addition, the detection unit 15 may detect a difference in the amount of change in the plurality of resonance frequencies obtained by using the plurality of adsorption layers, which will be described below.

The detection unit 15 takes in the frequency signal of the oscillation unit 14, samples the frequency signal, for example, every second, and stores the sampled frequency signal in a memory 18 as time-series data. In addition, the memory 18 stores measurement time and frequency tolerance. On the basis of the measurement time and the frequency tolerance, the detection unit 15 measures the resonance frequency of the crystal oscillator 27 and detects the amount of change in the resonance frequency of the crystal oscillator resulting from contact with the target chemical liquid.

The measurement time is the time required to obtain the amount of change in the resonance frequency resulting from the contact of the impurities with the adsorption layer 34. The measurement time is not particularly limited and is appropriately determined depending on the supply flow rate of the target chemical liquid, or the like. For example, 10 minutes or more is preferable, and 30 minutes or more is preferable. An upper limit is not particularly limited, but from the viewpoint of productivity, 3 hours or less is preferable, and 2 hours or less is more preferable.

The frequency tolerance is a threshold value for determining whether or not a value that is an index of frequency stabilization has become a sufficiently small value equivalent to the stabilization in a case where whether or not the frequency is stable is determined. The frequency tolerance is appropriately set depending on, for example, set measurement sensitivity. For example, in a case where the resonance frequency is 30 MHz, an error range allowed in the measurement time in a case where the measurement sensitivity is 5 Hz is set to, for example, 0.5 Hz. This is equivalent to 0.0167 ppm. The tolerance corresponding to the error range is equal to or less than $1.67 \times 10^{-8}$ (0.0167 ppm).

The detection unit 15 detects the frequency by, for example, a frequency counter that is a known circuit. In addition to this, for example, as described in JP2006-258787A, a frequency signal may be analog-to-digital converted and processed by a carrier move to generate a rotation vector that rotates at the frequency of the frequency signal, and the frequency may be detected by using a method such as finding the velocity of the rotation vector. In the detection unit 15, it is preferable to use such digital processing because the detection accuracy of the frequency is high.

The calculation unit 16 reads out the permissible range of the amount of change in the resonance frequency based on the preset purity of the target chemical liquid stored in the memory 18, and compares the permissible range of the amount of change in the resonance frequency stored in the memory 18 with the amount of change in the resonance frequency obtained by the detection unit 15 to manage the purity of the chemical liquid. For example, in a case where the amount of change in the resonance frequency is within the permissible range through the above-described comparison, the display unit 23 displays that the purity of the chemical liquid is within a permissible range. On the other hand, in a case where the amount of change in the resonance frequency exceeds the permissible range, the display unit 23 displays that the purity of the chemical liquid exceeds the permissible range. In addition to this, in a case where the amount of change in the resonance frequency is within the permissible range, an event in which the purity of the chemical liquid is within the permissible range may be output to the output unit 24. On the other hand, in a case where the amount of change in the resonance frequency exceeds the permissible range, an event in which the purity of the chemical liquid exceeds the permissible range may be output to the output unit 24.

The memory 18 stores the above-described amount of change in the resonance frequency based on the preset purity of the target chemical liquid and the permissible range thereof. In addition to this, the memory 18 may store the resonance frequency of the crystal oscillator, or the like. As will be described below, in a configuration in which a plurality of electrodes are provided on the crystal oscillator, the difference between the resonance frequency of each electrode and the resonance frequency between the electrodes may be stored.

Figure 3:
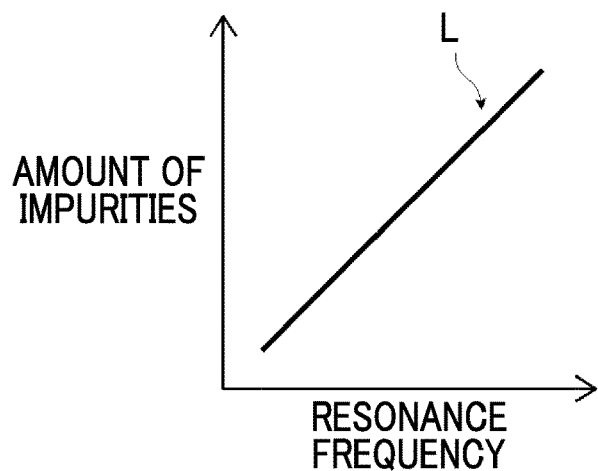
FIG. 3 is a graph showing an example of a calibration curve showing a relationship between the amount of impurities and the resonance frequency of a crystal oscillator.

In addition, as for the amount of change in the resonance frequency stored in the memory 18, for example, as shown in FIG. 3, a calibration curve L showing the relationship between the amount of impurities in a specific target chemical liquid and the resonance frequency of the crystal oscillator 27 can be found, and on the basis of the calibration curve L, the relationship between the amount of impurities in the specific target chemical liquid and the amount of change in the resonance frequency can be obtained. Additionally, by setting the permissible range for the calibration curve L, the permissible range of the amount of change in the resonance frequency can be set. The amount of impurities on the calibration curve L shown in FIG. 3 is, for example, the amount of impurities measured using a surface inspection device. More specifically, after a predetermined amount of the target chemical liquid is applied to a predetermined substrate (for example, a silicon wafer), the number of defects on the substrate to which the target chemical liquid has been applied is measured using the surface inspection device, and the number of defects obtained can be used as the amount of impurities.

In addition, examples of the surface inspection device include a device that irradiates a substrate, to which the target chemical liquid has been applied, with a laser beam, detects the laser beam scattered due to defects present on the substrate, and detects impurities present on the substrate. By performing measurement while rotating the substrate during irradiation with the laser beam, the coordinate position of a defect can be derived from the rotation angle of the substrate and the radial position of the laser beam. Examples of such a device include "SP-5" made by KLA Tencor, but may include a surface inspection device (typically a succession machine of "SP-5", or the like) having a resolution equal to or higher than that of "SP-5", in addition to this.

The display unit 23 displays the amount of change in the resonance frequency obtained by the calculation unit 16, and includes, for example, a display. The display is not particularly limited as long as the display can display texts and images, and a liquid crystal display device or the like is used. Additionally, the items displayed on the display unit 23 are not limited to the amount of change in the obtained resonance frequency but may be a resonance frequency. As will be described below, a difference in the amount of change in a plurality of resonance frequencies obtained by using a plurality of adsorption layers may be displayed, and various setting items, input information, and the like, which are set by the measuring device 10, may be displayed.

The output unit 24 displays the obtained amount of change in the resonance frequency, the resonance frequency, or the like on a medium. More specifically, for example, at least one of texts, symbols, or barcodes is used for display. The output unit 24 includes a printer or the like. An information display unit on which resonance frequency information on the chemical liquid of a set described below is displayed can be obtained by the output unit 24.

The input unit 25 is various input devices for inputting various information from a mouse, a keyboard, and the like according to an operator's instruction. For example, the setting of the measuring device 10 and the call of data from the memory 18 are performed via the input unit 25.

In addition, the input unit 25 also includes an interface for inputting information to be stored in the memory 18, and the information is stored in the memory 18 through an external storage medium or the like.

In addition, the measuring device 10 only needs to be able to obtain the obtained amount of change in the resonance frequency and does not necessarily require a configuration other than obtaining the amount of change in the resonance frequency. From this, for example, the calculation unit 16 is necessary in the management method but is not necessarily required in the measuring device 10 for obtaining the amount of change in the resonance frequency.

The flow cell unit 12 is a sensing unit that senses the impurities in the chemical liquid containing an organic solvent. The flow cell unit 12 is connected to the supply unit 20 by using a first tube 29a and a second tube 29b. The supply unit 20 allows the target chemical liquid to pass through the first tube 29a, supplies the target chemical liquid to the crystal oscillator, and allows the target chemical liquid to pass through the second tube 29b to recover the target chemical liquid. The supply unit 20 allows the target chemical liquid to pass through the first tube 29a and the second tube 29b without coming into contact with the target chemical liquid, and for example, a peristaltic pump is used. The supply unit 20 is not particularly limited as long as the supply unit can supply the liquid without coming into contact with the target chemical liquid, and for example, a syringe pump can be used.

The temperature adjustment unit 28 has, for example, a Peltier element. The temperature of the target chemical liquid is maintained by the Peltier element. Accordingly, the temperature of the target chemical liquid can be kept constant, and the viscosity of the target chemical liquid can be kept within a certain range. Fluctuations in measurement conditions of the purity can be reduced. In addition, the configuration of the temperature adjustment unit 28 is not particularly limited as long as the temperature of the target chemical liquid can be maintained.

[Crystal Oscillator Sensor]

As described above, the crystal oscillator sensor 26 has the crystal oscillator 27. However, the crystal oscillator 27 has, for example, a disk shape, and an electrode 30 is provided on a front surface 27a of the crystal oscillator 27, and an electrode 31 is provided on a back surface 27b.

The adsorption layer 34 for adsorbing the impurities is provided on a surface 30a of the electrode 30 provided on the front surface 27a of the crystal oscillator 27. The target chemical liquid containing an organic solvent is brought into contact with the adsorption layer 34.

As the crystal oscillator 27, for example, an AT-cut type crystal oscillator is used. The AT-cut type crystal oscillator is an oscillator cut out at an angle of 35° 15' from a Z axis of artificial quartz. The crystal oscillator sensor 26 is not limited to the configuration shown in FIG. 2.

The oscillation unit 14 is electrically connected to the electrode 30 and the electrode 31. The oscillation unit 14 applies a high-frequency signal of a sine wave to the electrodes 30 and 31 as a frequency signal, and has, for example, an oscillation circuit. The crystal oscillator 27 vibrates at the resonance frequency by the oscillation unit 14. The resonance frequency of the crystal oscillator 27 is, for example, 27 MHz or 30 MHz.

The adsorption layer 34 is made of at least one material of, for example, Si, Au, $SiO_2$, SiOC, Cu, Co, W, Ti, TiN, Ta, TaN, or a photosensitive resin composition. The types of impurities that are easily adsorbed differ depending on materials that constitute the adsorption layer. Thus, for example, in a case where the amount of impurities in the target chemical liquid is found by the above-described surface inspection device and the number of defects is associated with the amount of change in the resonance frequency, it is preferable that the substrate to which the chemical liquid used to measure the number of defects with the surface inspection device is applied and the adsorption layer are made of the same material. That is, in a case where an Si layer is used as the adsorption layer, it is preferable to use an Si substrate (silicon wafer) as the substrate.

The adsorption layer 34 can be formed by a vapor phase method such as a sputtering method, a chemical vapor deposition (CVD) method, a coating method, or the like.

In addition, the type of the photosensitive resin composition is not particularly limited, and examples thereof include known photosensitive resin compositions. Examples of components contained in the photosensitive resin composition include a resin having the group that produces a polar group by the action of an acid, and a photoacid generator. The photosensitive resin composition may further contain a basic compound, a hydrophobic resin, or the like.

In the crystal oscillator sensor 26, the resonance frequency of the crystal oscillator 27 changes depending on the amount of impurities adsorbed on the adsorption layer 34. By measuring the resonance frequency before and after contact with the target chemical liquid, the amount of change in the resonance frequency can be obtained. In addition, the amount of change $\Delta F$ in the resonance frequency of the crystal oscillator 27 can be expressed by the following equation referred to as the Sauerbrey equation. In the following equation, $F_0$ is the resonance frequency, $\Delta m$ is mass change amount, $\rho$ is the density of the crystal, $\mu$ is the shear stress of the crystal, and A is the area of the electrodes. From the following equation, by increasing the resonance frequency $F_0$ of the crystal oscillator, the mass detection sensitivity can be increased, that is, the measurement accuracy of impurities can be enhanced.

$$\Delta F = -\frac{2F_0^2}{\sqrt{\rho\mu}} \frac{\Delta m}{A} \qquad \text{[Equation 1]}$$

[Flow Cell Unit]

Figure 4:
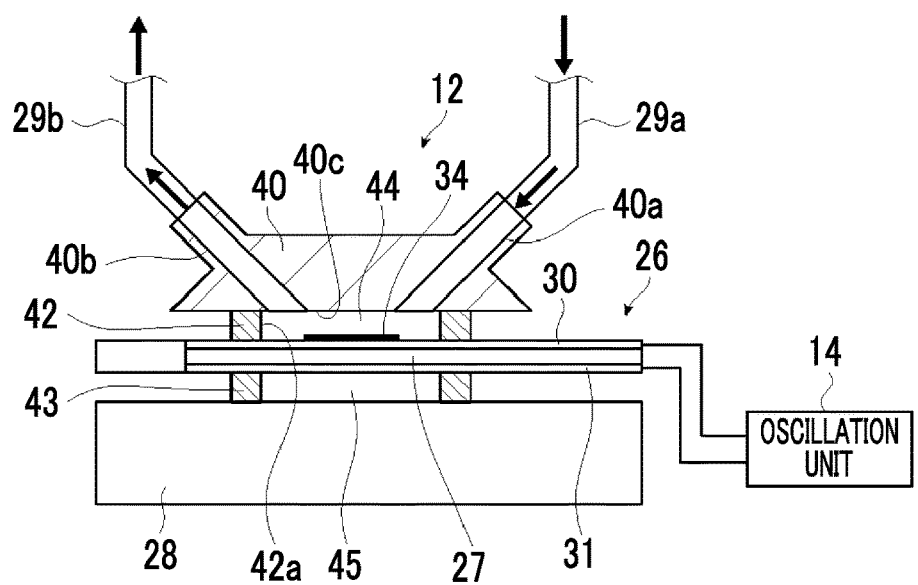
FIG. 4 is a schematic diagram showing an example of a flow cell unit of the measuring device according to the embodiment of the present invention.

FIG. 4 is a schematic diagram showing an example of the flow cell unit of the measuring device according to the embodiment of the present invention.

In the flow cell unit 12, for example, the crystal oscillator sensor 26 is disposed on the temperature adjustment unit 28 via a seal portion 43. The seal portion 42 is provided on the crystal oscillator sensor 26 along the periphery of the crystal oscillator 27. A block 40 is disposed on the seal portion 42. The block 40 is provided with a supply passage 40a for supplying the target chemical liquid to the crystal oscillator sensor 26. The supply passage 40a is connected to the first tube 29a. Additionally, the block 40 is provided with a discharge passage 40b for discharging the target chemical liquid from the crystal oscillator sensor 26. The discharge passage 40b is connected to the second tube 29b. That is, the flow cell unit 12 further has the seal portion 42 disposed on the crystal oscillator sensor 26, the supply passage 40a that is disposed on the crystal oscillator sensor 26 via the seal portion 42 and supplies the target chemical liquid to the crystal oscillator sensor 26, the block 40 provided with the discharge passage 40b for discharging the target chemical liquid from the crystal oscillator sensor 26, and a liquid feeding unit including the first tube 29a connected to the supply passage 40a and the second tube 29b connected to the discharge passage 40b.

The target chemical liquid that has passed through the first tube 29a and the supply passage 40a is supplied to a region 44 formed by being surrounded by the crystal oscillator sensor 26, the seal portion 42, and the block 40. That is, the seal portion 42 is disposed outside the region 44. Accordingly, the target chemical liquid comes into contact with the adsorption layer 34 on the surface 30a of the electrode 30 of the crystal oscillator 27 of the crystal oscillator sensor 26. Additionally, the target chemical liquid passes through the discharge passage 40b and the second tube 29b and is discharged from the region 44. The first tube 29a and the discharge passage 40b, and the second tube 29b and the discharge passage 40b constitute a circulation line.

The movement of the target chemical liquid between the first tube 29a and the supply passage 40a and the second tube 29b and the discharge passage 40b is performed by the supply unit 20 (refer to FIG. 1) as described above.

For example, the seal portion 42 and the seal portion 43 have the same size and include, for example, an O-ring. In addition, the target chemical liquid is not supplied to a region 45 formed by being surrounded by the crystal oscillator sensor 26, the seal portion 43, and the temperature adjustment unit 28.

Additionally, in the flow cell unit 12, by making at least a part of a liquid contact portion coming into contact with the target chemical liquid of a fluorine-based resin, elution to the target chemical liquid can be suppressed and a decrease in measurement accuracy of the purity can be suppressed, which is preferable.

In the measuring device 10, a face, which is formed by being surrounded by the above-described crystal oscillator sensor 26, the seal portion 42, and the block 40 and constitutes the region 44 for holding the target chemical liquid on the crystal oscillator sensor 26, corresponds to a part of the liquid contact portion that comes into contact with the target chemical liquid. In addition to the region 44, in the supply unit where the target chemical liquid is brought into contact with the crystal oscillator sensor 26, the portion of the liquid feeding unit that feeds the target chemical liquid to the crystal oscillator sensor is also the liquid contact portion. It is preferable that at least a part of the liquid contact portion is made of the fluorine-based resin. That is, it is preferable that at least a part of the liquid contact portion coming into contact with the target chemical liquid in the measuring device (the measuring device having the above-described crystal oscillator sensor) that senses the impurities in the chemical liquid containing an organic solvent is made of the fluorine-based resin. In addition, as the above liquid contact portion, a liquid contact portion other than the adsorption layer and the crystal oscillator is preferable. Examples of the liquid feeding unit include a supply line that feeds the liquid in one direction and a circulation line that circulates and supplies the target chemical liquid to the crystal oscillator sensor.

More specifically, in FIG. 4, the liquid contact portion is a face 40c coming into contact with a region 44 of the block 40 of the flow cell unit 12, a face 42a that is a portion coming into contact with the region 44 of the seal portion 42 for holding the target chemical liquid disposed on the crystal oscillator sensor 26 in the region 44, the supply passage 40a of the block 40, and the discharge passage 40b of the block 40. Additionally, it is preferable that the inside of the first tube 29a and the inside of the second tube 29b are also liquid contact portions coming into contact with the target chemical liquid, and the portions of the first tube 29a and the second tube 29b coming into contact with the target chemical liquid are made of the fluorine-based resin.

Particularly, it is preferable that at least a part of the liquid contact portion coming into contact with the target chemical liquid of the seal portion 42, the liquid contact portion coming into contact with the target chemical liquid of the block 40, and the liquid contact portion coming into contact with the target chemical liquid of the liquid feeding unit are made of the fluorine-based resin.

The fluorine-based resin may be any resin containing a fluorine atom.

The fluorine-based resin is not particularly limited as long as the fluorine-based resin is a resin (polymer) containing a fluorine atom, and a known fluorine-based resin can be used. Examples of the fluorine-based resin include polytetrafluoroethylene (PTFE, Tensile strength: to 35 MPa, Shore D Hardness: 50 to 55), perfluoroalkoxyalkane, polychlorotrifluoroethylene, polyvinylidene fluoride, an ethylene tetrafluoroethylene copolymer, an ethylene chlorotrifluoroethylene copolymer, a perfluoroethylene propene copolymer, a tetrafluoroethylene perfluoroalkyl vinyl ether copolymer, and a cyclized polymer of perfluoro (butenyl vinyl ether) (Cytop (registered trademark)).

Particularly, in a case where the liquid contact portion (the portion coming into contact with the target chemical liquid) of the block 40 of the flow cell unit 12 coming into contact with the target chemical liquid is made of a fluorine-based resin, it is preferable that the tensile strength of the above fluorine-based resin is 20 to 60 MPa. Additionally, the Shore D hardness of the fluorine-based resin is preferably 60 to 80.

It is preferable that examples of the fluorine-based resin constituting the liquid contact portion coming into contact with the target chemical liquid of the block 40 include the perfluoroalkoxyalkane (PFA, Tensile strength: 25 to 35 MPa, Shore D hardness: 62 to 66), the ethylene tetrafluoroethylene copolymer (ETFE, Tensile strength: 38 to 42 MPa, Shore D hardness: 67 to 78), the perfluoroethylene propene copolymer (FEP, tensile strength: 20 to 30 MPa, Shore D hardness: 60 to 65), the polychlorotrifluoroethylene (PCTFE, Tensile strength: 31 to 41 MPa, Shore D hardness: 75 to 80), or the polyvinylidene fluoride (PVDF, Tensile strength: 30 to 60 MPa, Shore D hardness: 64 to 79).

In addition, the method of measuring the tensile strength is performed according to JIS K 7161.

The method of measuring the Shore D hardness is performed according to JIS K 7215.

Additionally, it is preferable that the fluorine-based resin constituting the liquid contact portion (a portion coming into contact with the target chemical liquid) coming into contact with the target chemical liquid in the liquid feeding unit that feeds the target chemical liquid to the region 44 has a repeating unit (hereinafter, also simply referred to as "specific repeating unit") including a fluorine atom, a carbon atom, and an atom other than the fluorine atom and the carbon atom. Examples of the above other atoms include a hydrogen atom and a chlorine atom. That is, it is preferable that the specific repeating unit includes the fluorine atom, the carbon atom, at least one other atom selected from the group consisting of the hydrogen atom and the chlorine atom.

As the fluorine-based resin constituting the portion of the above liquid feeding unit coming into contact with the target chemical liquid, a ternary copolymer (THV soft fluororesin) of tetrafluoroethylene, hexafluoropropylene, and vinylidene fluoride, the polyvinylidene fluoride, and the ethylene tetrafluoroethylene copolymer, or the polychlorotrifluoroethylene is preferable.

The method of measuring the tensile strength and the Shore D hardness is as described above.

The portion (the face 42a that is a portion coming into contact with the region 44), coming into contact with the target chemical liquid, of the seal portion 42 that holds the target chemical liquid disposed on the crystal oscillator sensor 26 in the region 44 is preferably made of the fluorine-based resin.

The tensile strength of the fluorine-based resin constituting the portion of the above seal portion 42 coming into contact with the target chemical liquid is preferably 20 to 40 MPa. Additionally, the Shore D hardness of the fluorine-based resin constituting the portion of the seal portion 42 coming into contact with the target chemical liquid is preferably 56 to 70. Additionally, the bending modulus of the fluorine-based resin constituting the portion of the above seal portion 42 coming into contact with the target chemical liquid is preferably 0.5 to 3 GPa.

In a case where the fluorine-based resin constituting the portion of the above seal portion 42 coming into contact with the target chemical liquid satisfies the above tensile strength, Shore D hardness, and bending modulus, the oscillation of the crystal oscillator sensor 26 is not hindered and more stable measurement can be carried out.

The method of measuring the tensile strength and the Shore D hardness is as described above.

The method of measuring the bending modulus is performed according to HS K7171.

As the fluorine-based resin constituting the portion of the above seal portion 42 coming into contact with the target chemical liquid, include the perfluoroalkoxyalkane, the perfluoroethylene propene copolymer, the ethylene chlorotrifluoroethylene copolymer, the ethylene tetrafluoroethylene copolymer, the polychlorotrifluoroethylene, or, the polyvinylidene fluoride is preferable.

The supply unit 20 circulates the target chemical liquid by using the first tube 29a and the second tube 29b, but the present invention is not limited to this, and a method of allowing the target chemical liquid to flow in one direction may be used. In this case, for example, a syringe pump can be used.

In a case where the target chemical liquid is circulated and supplied to the crystal oscillator 27, the circulation flow rate of the target chemical liquid is preferably 0.01 to 1000 ml/s. In a case where the circulation flow rate is 0.01 to 1000 ml/s, a sufficient amount of impurities to be detected can be attached to the surface of the adsorption layer 34.

In a case where the amount of increase in impurities in a case where the target chemical liquid is circulated for 1 hour is equal to or less than 1000 mass ppt, it is preferable because the measurement accuracy of purity does not decrease.

The disposition of the crystal oscillator sensor 26 in the flow cell unit 12 is not particularly limited.

[Management Method]

Next, a management method of managing the purity of the chemical liquid containing an organic solvent by sensing the impurities in the chemical liquid will be described.

The management method includes Step 1 of preparing a target chemical liquid containing an organic solvent, Step 2 of bringing a crystal oscillator sensor including an adsorption layer that adsorbs impurities (in a measuring device that senses impurities in the chemical liquid containing an organic solvent) and a crystal oscillator into the target chemical liquid and obtaining an amount of change in a resonance frequency of the crystal oscillator resulting from the contact of the target chemical liquid, and Step 3 of comparing whether or not the obtained amount of change in the resonance frequency falls within a permissible range of the amount of change in the resonance frequency based on a preset purity of the target chemical liquid to manage the purity of the chemical liquid.

As shown in the above-described measuring device 10, in Step 2, at least a part of a liquid contact portion in the measuring device 10 coming into contact with the target chemical liquid is made of a fluorine-based resin.

In addition, in the management method, similar to the above-described measuring device, the target chemical liquid feeds the target chemical liquid to the crystal oscillator sensor and brings the target chemical liquid into contact with the crystal oscillator sensor. The target chemical liquid may be attached to the crystal oscillator sensor by causing the target chemical liquid to flow in one direction. Additionally, the target chemical liquid may be circulated and supplied to the crystal oscillator, and the circulation flow rate of the target chemical liquid may be 0.01 to 1000 ml/s.

Hereinafter, the management method will be described more specifically by taking the above-described measuring device 10 shown in FIG. 1 as an example. In the management method, for example, the target chemical liquid is circulated and supplied.

As described above, the target chemical liquid containing an organic solvent for managing the purity is prepared (Step 1), and the target chemical liquid is stored in the supply unit 20 of the measuring device 10. The impurities are contained in the target chemical liquid.

Next, passing the target chemical liquid through the first tube 29a and the supply passage 40a of the block 40 from the supply unit 20 to the flow cell unit 12 to supply the target chemical liquid to the region 44, passing the target chemical liquid through the discharge passage 40b of the block 40 and the second tube 29b to return the target chemical liquid to the supply unit 20, and passing the target chemical liquid through the first tube 29a and the supply passage 40a of the block 40 again to supply the target chemical liquid the region 44 are carried out repeatedly. Accordingly, the target chemical liquid is circulated and supplied to the crystal oscillator 27 and brought into contact with the adsorption layer 34 of the crystal oscillator 27.

A high-frequency signal of a sine wave is applied as a frequency signal from the oscillation unit 14 to the crystal oscillator sensor 26, the crystal oscillator 27 is oscillated at a resonance frequency before the supply of the target chemical liquid, and resonance frequency before the supply of the target chemical liquid is obtained by the detection unit 15. Thereafter, for example, after the target chemical liquid is supplied to the crystal oscillator 27 for a predetermined time, the detection unit 15 obtains the resonance frequency and then obtains the amount of change in the resonance frequency (Step 2). That is, the amount of change in the resonance frequency can be obtained by carrying out the method of measuring the chemical liquid having Step 1 and Step 2. The amount of change in the resonance frequency obtained by the detection unit 15 is output to the calculation unit 16 and stored in the calculation unit 16.

The calculation unit 16 reads out the permissible range of the amount of change in the resonance frequency based on the preset purity of the target chemical liquid stored in the memory 18, and compares the permissible range of the amount of change in the resonance frequency stored in the memory 18 with the amount of change in the resonance frequency obtained by the detection unit 15 to manage the purity of the chemical liquid (Step 3). For example, in a case where the amount of change in the resonance frequency is within the permissible range through the above-described comparison, the display unit 23 displays that the purity of the chemical liquid is within a permissible range. On the other hand, in a case where the amount of change in the resonance frequency exceeds the permissible range, the display unit 23 displays that the purity of the chemical liquid exceeds the permissible range.

In the management method, the purity of the chemical liquid can be easily obtained, and the purity of the target chemical liquid can be managed on the basis of the obtained purity. Accordingly, the quality of the chemical liquid can be managed.

In addition, the amount of change in the resonance frequency stored in the memory 18 and the permissible range thereof can be obtained on the basis of, for example, the calibration curve L shown in FIG. 3 as described above.

In addition, it is preferable that the above management method is carried out in a clean room. More specifically, it is preferable that the above management method is carried out in a clean room that satisfies the cleanliness of Class 2 or higher defined by the International Standard ISO 14644-1: 2015 established by the International Organization for Standardization.

[Other Examples of Crystal Oscillator Sensor]

Figure 5:
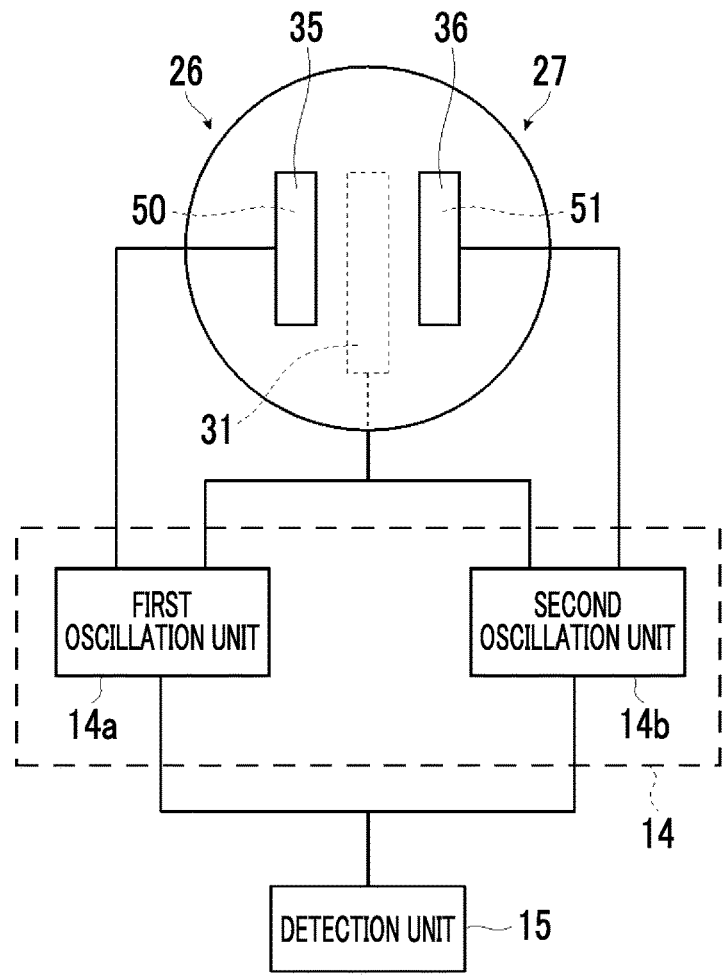
FIG. 5 is a schematic diagram showing a second example of the crystal oscillator sensor according to the embodiment of the present invention.
Figure 6:
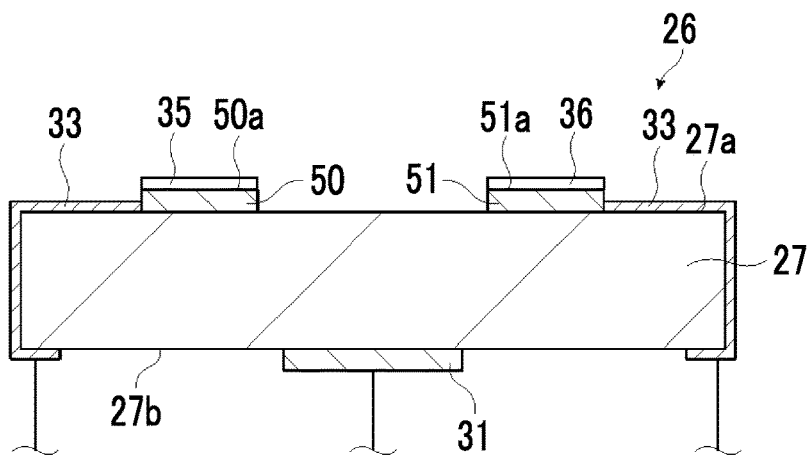
FIG. 6 is a schematic cross-sectional view showing the second example of the crystal oscillator sensor according to the embodiment of the present invention.
Figure 7:
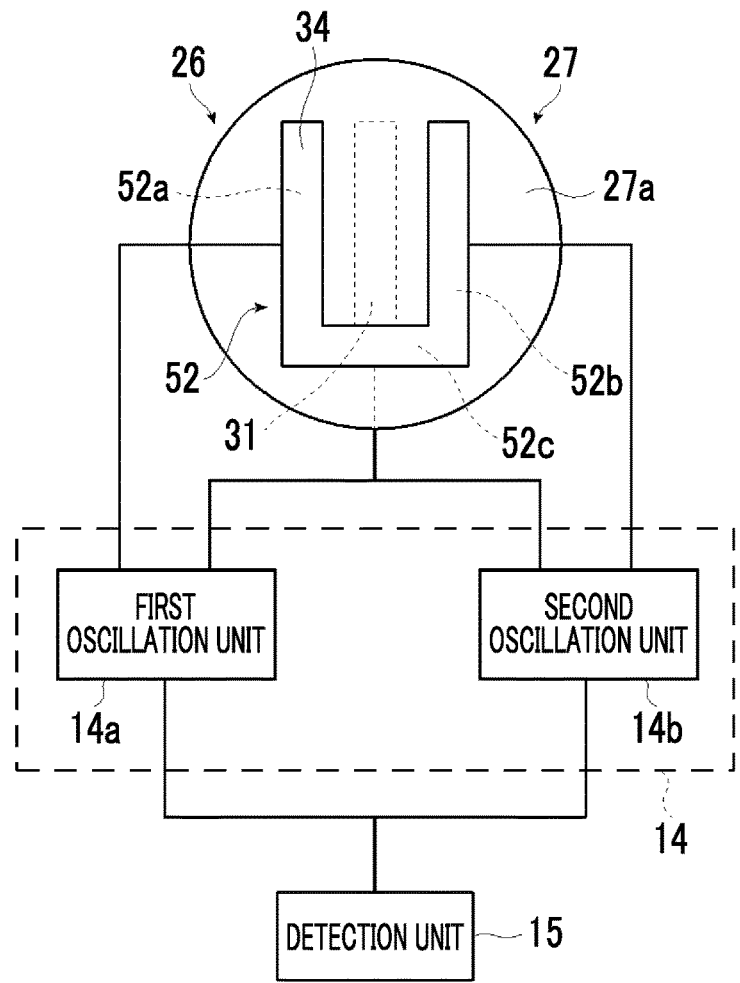
FIG. 7 is a schematic diagram showing a third example of the crystal oscillator sensor according to the embodiment of the present invention.
Figure 8:
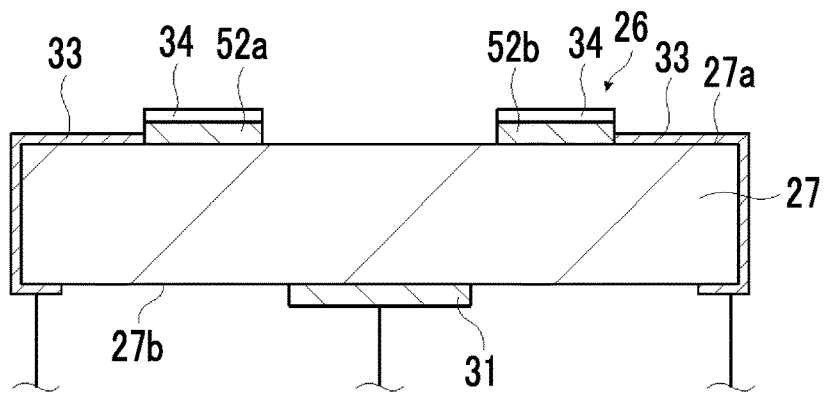
FIG. 8 is a schematic cross-sectional view showing the third example of the crystal oscillator sensor according to the embodiment of the present invention.

FIG. 5 is a schematic diagram showing a second example of the crystal oscillator sensor according to the embodiment of the present invention, and FIG. 6 is a schematic cross-sectional view showing the second example of the crystal oscillator sensor according to the embodiment of the present invention. FIG. 7 is a schematic diagram showing a third example of the crystal oscillator sensor according to the embodiment of the present invention, and FIG. 8 is a schematic cross-sectional view showing the third example of the crystal oscillator sensor according to the embodiment of the present invention. In the crystal oscillator sensor 26 shown in FIGS. 4 to 8, the same components as those of the crystal oscillator sensor 26 shown in FIG. 2 are designated by the same reference signs, and the detailed description thereof will be omitted.

The crystal oscillator sensor 26 shown in FIG. 2 has a configuration in which one electrode 30 is provided on the front surface 27a of the crystal oscillator 27, but the present invention is not limited to this. As shown in FIGS. 5 and 6, the first electrode 50 and the second electrode 51 may be configured to be provided on the front surface 27a of the crystal oscillator 27. The first electrode 50 and the second electrode 51 are formed of, for example, a rectangular conductive layer, and are disposed parallel to each other at a distance. The first electrode 50 and the second electrode 51 are in a state of being electrically insulated from each other. The first adsorption layer 35 is provided on a surface 50a of the first electrode 50, and the second adsorption layer 36 is provided on a surface 51a of the second electrode 51.

The first electrode 50 and the electrode 31 are electrically connected to a first oscillation unit 14a. The second electrode 51 and the electrode 31 are electrically connected to a second oscillation unit 14b. The first oscillation unit 14a and the second oscillation unit 14b are provided in the oscillation unit 14 and can apply a high-frequency signal of a sine wave to the first electrode 50 and the electrode 31 and the second electrode 51 and the electrode 31 independently of each other as a frequency signal, thereby oscillating the crystal oscillator 27 at the resonance frequency.

Additionally, the first oscillation unit 14a and the second oscillation unit 14b are electrically connected to the detection unit 15, respectively. The detection unit 15 has a switch unit (not shown) that switches the connection between the first oscillation unit 14a and the second oscillation unit 14b. The switch unit alternately takes the frequency signal of the first oscillation unit 14a and the frequency signal of the second oscillation unit 14b into the detection unit 15. Accordingly, the detection unit 15 can independently obtain the resonance frequency of the first electrode 50 and the resonance frequency of the second electrode 51.

The first adsorption layer 35 on the surface 50a of the first electrode 50 and the second adsorption layer 36 on the surface 51a of the second electrode 51 may be the same or different from each other. In a case where the first adsorption layer 35 and the second adsorption layer 36 are different from each other, a difference in resonance frequency between the first electrode 50 and the second electrode 51 can be used, and the purity can be easily estimated depending on whether or not the difference falls within the permissible range of the amount of change in the resonance frequency based on the preset purity of the target chemical liquid. Accordingly, the purity of the chemical liquid can be more easily obtained, the management of the purity becomes easy, and the quality of the chemical liquid can be easily managed. It is preferable that at least one of the first adsorption layer 35 or the second adsorption layer 36 is a Au layer. By forming the Au layer, one of the first electrode 50 and the second electrode 51 can be used as a reference electrode.

Additionally, as shown in FIGS. 7 and 8, the electrode 52 may be configured to be provided on the front surface 27a of the crystal oscillator 27. The electrode 52 has a first electrode portion 52a, a second electrode portion 52b, and a connecting portion 52c that connects the first electrode portion 52a and the second electrode portion 52b to each other at one end. The first electrode portion 52a and the second electrode portion 52b are formed of, for example, a rectangular conductive layer, and are disposed parallel to each other at a distance. The first electrode portion 52a and the second electrode portion 52b are electrically connected to each other. The adsorption layer 34 is provided on the electrode 52.

The first electrode portion 52a and the electrode 31 are electrically connected to the first oscillation unit 14a. The second electrode portion 52b and the electrode 31 are electrically connected to the second oscillation unit 14b. The first oscillation unit 14a and the second oscillation unit 14b are provided in the oscillation unit 14 and can apply a high-frequency signal of a sine wave to the first electrode 50 and the electrode 31 and the second electrode 51 and the electrode 31 independently of each other as a frequency signal, thereby oscillating the crystal oscillator 27 at the resonance frequency.

Additionally, the first oscillation unit 14a and the second oscillation unit 14b are electrically connected to the detection unit 15, respectively. The detection unit 15 has a switch unit (not shown) that switches the connection between the first oscillation unit 14a and the second oscillation unit 14b. The switch unit alternately takes the frequency signal of the first oscillation unit 14a and the frequency signal of the second oscillation unit 14b into the detection unit 15. Accordingly, the detection unit 15 can independently obtain the resonance frequency of the first electrode portion 52a and the resonance frequency of the second electrode portion 52b.

Also in the crystal oscillator sensor 26 shown in FIG. 8, the adsorption layers 34 are provided on the first electrode portion 52a and the second electrode portion 52b, but the adsorption layers may be different from each other on the first electrode portion 52a and the second electrode portion 52b. In a case where the adsorption layers are different, the purity can be easily estimated by using the difference in resonance frequency between the first electrode portion 52a and the second electrode portion 52b. Accordingly, the purity of the chemical liquid can be more easily obtained, the management of the purity becomes easy, and the quality of the chemical liquid can be easily managed. It is preferable to form a Au layer on at least one of the first electrode portion 52a or the second electrode portion 52b. By forming the Au layer, one of the first electrode portion 52a and the second electrode portion 52b can be used as the reference electrode.

[Set]

As a method of indicating the quality of the chemical liquid, the quality of the chemical liquid can be easily managed by showing the purity measured by the above-described measuring device 10 or the like in association with the chemical liquid. The association between such a chemical liquid and the purity of the chemical liquid is referred to as a set.

The set has the chemical liquid and an information display unit that displays or stores resonance frequency information of the chemical liquid. By obtaining the amount of change in the resonance frequency of the crystal oscillator resulting from bringing the chemical liquid into contact with the crystal oscillator sensor including the adsorption layer that adsorbs the impurities in the chemical liquid and the crystal oscillator and comparing the obtained amount of change in the resonance frequency with the amount of change in the resonance frequency based on the preset purity of the chemical liquid, the evaluation of the purity of the chemical liquid is given with respect to the obtained amount of change in the resonance frequency. The resonance frequency information of the chemical liquid in which the amount of change in the obtained resonance frequency and the purity of the chemical liquid, which are based on the evaluation, are associated with each other and which is recorded as the resonance frequency information of the chemical liquid, is used to obtain information on the purity of the chemical liquid. The information on the purity of the chemical liquid can be obtained from the resonance frequency information of the chemical liquid.

In addition, the above-described evaluation is given by measuring the purity of the chemical liquid by using the above-described measuring device 10.

Figure 9:
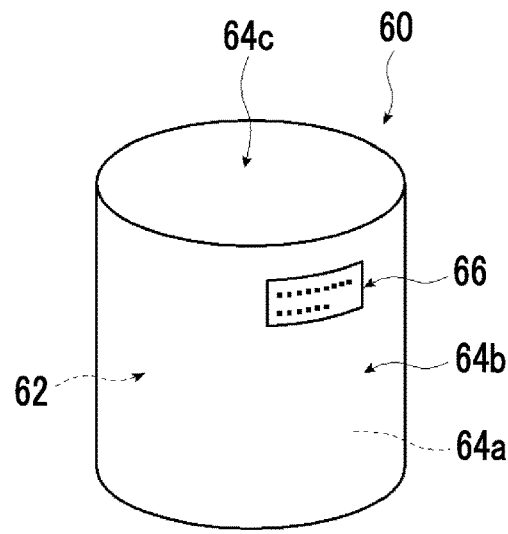
FIG. 9 is a schematic perspective view showing an example of a set according to the embodiment of the present invention.

Hereinafter, the set will be described more specifically. FIG. 9 is a schematic perspective view showing an example of the set of the embodiment of the present invention, and FIG. 10 is a schematic diagram showing an example of the information display unit of the set of the embodiment of the present invention.

As shown in FIG. 9, a set 60 has, for example, a container 64 that stores the chemical liquid 62 in an inside 64a. The container 64 has, for example, a cylindrical shape, and an information display unit 66 is provided on a side surface 64b. In addition, the information display unit 66 may be provided on the upper surface 64c. The information display unit 66 displays or stores the resonance frequency information of the chemical liquid.

Figure 10:
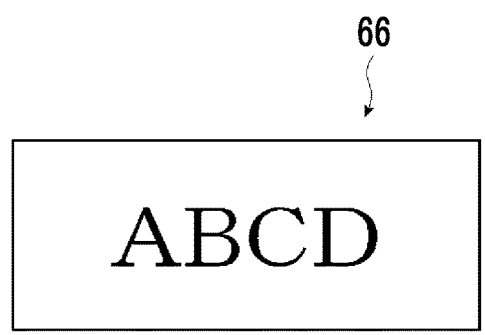
FIG. 10 is a schematic diagram showing an example of an information display unit of the set according to an embodiment of the present invention.

As the information display unit 66, for example, as shown in FIG. 10, the resonance frequency information of the chemical liquid is indicated by using texts. However, the present invention is not limited to this, and at least one of texts, symbols, or barcodes can be used to display the resonance frequency information of the chemical liquid on the information display unit 66. The barcodes are not particularly limited and may be secondary codes.

The information display unit 66 is not limited to the display by texts as shown in FIG. 10 and may be, for example, an information recording medium such as integrated circuit (IC) tags. In the case of the IC tags, the resonance frequency information of the chemical liquid can be read in a non-contact manner by using an IC tag reader. By using the barcodes or the IC tags as the information display unit 66, the quality of the chemical liquid can be managed by using, for example, a reader.

The information display unit 66 on which the resonance frequency information of the chemical liquid is displayed by the output unit 24 can be obtained by the output unit 24 of the measuring device 10.

The management method, the measuring method, the measuring device, the crystal oscillator sensor and the set of the present invention are basically configured as described above. Although the management method, the measuring method, the measuring device, the crystal oscillator sensor, and the set of the present invention have been described in detail above, the present invention is not limited to the above-described embodiment and it goes without saying that various improvements or changes may be made without departing from the scope of the present invention.

The target chemical liquid (hereinafter, also simply referred to as "chemical liquid") used in the present invention contains an organic solvent.

In the present specification, the organic solvent is intended to be a liquid organic compound contained in a content exceeding 10,000 mass ppm per component with respect to the total mass of the chemical liquid. That is, in the present specification, the liquid organic compound contained in excess of 10,000 mass ppm with respect to the total mass of the chemical liquid corresponds to the organic solvent.

Additionally, in the present specification, the liquid means a liquid at 25° C. and under atmospheric pressure.

The content of the organic solvent in the chemical liquid is not particularly limited, but is 98.0% by mass or more is preferable, more preferably more 99.0% by mass, much more preferably 99.90% by mass or more, and particularly preferably more than 99.95% by mass, with respect to the total mass of the chemical liquid. The upper limit is less than 100% by mass.

As the organic solvent, one type may be used alone, or two or more types may be used. In a case where two or more types of organic solvents are used, it is preferable that the total content is within the above range.

The type of the organic solvent is not particularly limited, and a known organic solvent can be used. Examples of the organic solvent may include alkylene glycol monoalkyl ether carboxylate, alkylene glycol monoalkyl ether, lactic acid alkyl ester, alkyl alkoxypropionate, cyclic lactone (preferably a carbon number of 4 to 10), or monoketone compound (preferably a carbon number of 4 to 10) that may have a ring, alkylene carbonate, alkyl alkoxyacetate, alkyl pyruvate, dialkyl sulfoxide, cyclic sulfone, dialkyl ether, monohydric alcohol, glycol, alkyl acetate ester, N-alkylpyrrolidone, and the like.

Examples of the organic solvent include, preferably, one or more types selected from the group consisting of propylene glycol monomethyl ether acetate (PGMEA), propylene glycol monomethyl ether (PGME), cyclohexanone (CHN), ethyl lactate (EL), propylene carbonate (PC), isopropanol (IPA), 4-methyl-2-pentanol (MIBC), butyl acetate (nBA), propylene glycol monoethyl ether, propylene glycol monopropyl ether, methyl methoxypropionate, cyclopentanone, γ-butyrolactone, diisoamyl ether, isoamyl acetate, dimethylsulfoxide, N-methylpyrrolidone, diethylene glycol, ethylene glycol, dipropylene glycol, propylene glycol, ethylene carbonate, sulfolane, cycloheptanone, and 2-heptanone.

Examples of using two or more types of organic solvents include the combined use of PGMEA and PGME, and the combined use of PGMEA and PC.

In addition, the type and content of the organic solvent in the chemical liquid can be measured by using a gas chromatograph mass spectrometer.

There is a case where the chemical liquid contains impurities other than the organic solvent. As described above, the resonance frequency changes as the impurities are adsorbed on the adsorption layer.

The impurities include metal impurities and organic impurities.

The metal impurities are intended as metal ions and metal impurities contained in a chemical liquid as a solid (elemental metal, particulate metal-containing compound, or the like).

The type of metal contained in the metal impurities is not particularly limited, and includes, for example, sodium (Na), potassium (K), calcium (Ca), iron (Fe), copper (Cu), magnesium (Mg), manganese (Mn), lithium (Li), aluminum (Al), chromium (Cr), nickel (Ni), titanium (Ti), and zirconium (Zn).

The metal impurities may be components that are inevitably contained in each component (raw material) contained in the chemical liquid, components that are inevitably contained during the manufacture, storage, and/or transfer of the chemical liquid, or may be added intentionally.

In a case where the chemical liquid contains the metal impurities, the content thereof is not particularly limited and may be 0.01 to 500 mass ppt with respect to the total mass of the chemical liquid.

In the present specification, the organic impurities are a compound different from the organic solvent which is a main component contained in the chemical liquid and is intended to be an organic substance contained in a content of 10,000 mass ppm or less with respect to the total mass of the chemical liquid. That is, in the present specification, the organic substance contained in the content of 10,000 mass ppm or less with respect to the total mass of the above-described chemical liquid corresponds to the organic impurities and does not correspond to the organic solvent.

In addition, in a case where the organic impurities including a plurality of types of compounds are contained in the chemical liquid and in a case where each compound corresponds to the above-described organic substance contained in a content of 10,000 mass ppm or less, each compound corresponds to the organic impurities.

In addition, water is not included in the organic impurities.

The organic impurities may be added to the chemical liquid or may be inevitably mixed in the chemical liquid in a producing process of the chemical liquid. Examples of cases in which the organic impurities are inevitably mixed in the producing process of the chemical liquid include a case where the organic impurities are contained in a raw material (for example, the organic solvent) used in the production of the chemical liquid, a case where mixing is performed in the producing process (for example, contamination) of the chemical liquid, or the like, but is not limited to the above.

The total content of organic impurities in the chemical liquid is not particularly limited and may be 0.1 to 5000 mass ppm with respect to the total mass of the chemical liquid.

As the organic impurities, one type may be used alone, or two or more types may be used in combination. In a case where two or more types of organic impurities are used in combination, the total content is preferably within the above range.

Examples of the organic impurities include dibutylhydroxytoluene (BHT), distearylthiodipropionate (DSTP), 4,4'-butylidenebis-(6-t-butyl-3-methylphenol), and 2,2'-methylenebis-(4-ethyl-6-t-butylphenol), and antioxidants such as the antioxidant described in JP2015-200775A; an unreacted raw material; a structural isomer and by-products produced during the production of the organic solvent; an eluent from members and the like constituting a production apparatus (for example, plasticizers eluted from a rubber member such as an O-ring) of the organic solvent; and the like.

The chemical liquid may contain water. The type of water is not particularly limited, and for example, distilled water, ion exchange water, and pure water can be used.

Water may be added to the chemical liquid or may be inevitably mixed in the chemical liquid in the producing process of the chemical liquid. Examples of cases in which the organic impurities are inevitably mixed in the producing process of the chemical liquid include a case where water is contained in a raw material (for example, the organic solvent) used in the production of the chemical liquid, a case where mixing is performed in the producing process (for example, contamination) of the chemical liquid, or the like.

The content of water in the chemical liquid is not particularly limited, but is generally preferably 2.0% by mass or less, more preferably 1.0% by mass or less, and much more preferably less than 0.5% by mass, with respect to the total mass of the chemical liquid.

In a case where the water content in the chemical liquid is 1.0% by mass or less, the manufacturing yield of semiconductor chips is more excellent.

In addition, the lower limit is not particularly limited but is about 0.01% by mass in many cases. In terms of production, it is difficult to keep the content of water below the above lower limit.

The method of preparing the above-described chemical liquid is not particularly limited, and examples thereof include a method of procuring an organic solvent through purchase and the like, and a method of reacting raw materials with each other to obtain an organic solvent. In addition, as the chemical liquid, it is preferable to prepare one having a small content of impurities as described above (for example, one having an organic solvent content of 99% by mass or more). Examples of commercially available products of such organic solvents include those referred to as "high-purity grade products".

In addition, as necessary, the chemical liquid may be subjected to a purification treatment.

Examples of a purification method include distillation and filtration.

EXAMPLES

Hereinafter, the present invention will be described in more detail on the basis of examples. The materials, amounts used, ratios, treatment contents, treatment procedures, and the like shown in the following examples can be appropriately changed as long as they do not depart from the spirit of the present invention. Therefore, the scope of the present invention should not be construed as limiting by the examples shown below.

Example A

[Production of Chemical Liquids]

First, the chemical liquids used in the examples described below were prepared. Specifically, first, high-purity grade organic solvent reagents having a purity of 99% by mass or more were purchased. After that, the purchased reagents are subjected to a filtration treatment in which the following filters are appropriately combined with each other to prepare chemical liquids (A1 to A20, B1 to B7, C1 to C5, D1 to D5, E1 to E7) having different amounts of impurities.

IEX-PTFE (15 nm): 15 nm IEX PTFE made by Entegris.
PTFE (12 nm): 12 nm PTFE made by Entegris.
UPE (3 nm): 3 nm PE filter made by Entegris.

In addition, in order to adjust the amount of impurities in the chemical liquids described below, a purchase source of the organic solvent reagents was appropriately changed, the purity grade was changed, and the distillation treatment was carried out before the above filtration treatment.

[Evaluation Using Crystal Oscillator Sensor (1)]

A crystal oscillator sensor (refer to FIG. 2) in which an Si layer is formed as an adsorption layer on an electrode portion was prepared, the crystal oscillator sensor was immersed in a chemical liquid shown in Table 1 described below for 60 minutes, and the amount of change (Hz) in the resonance frequency of a final crystal oscillator was obtained. In addition, the resonance frequency of the crystal oscillator before being immersed in the chemical liquid was 27 MHz.

The results are collectively shown in Table 1.

[Evaluation Using Surface Inspection Device (1)]

First, a silicon wafer having a diameter of about 300 mm (12 inches) was prepared.

Next, a surface inspection device (SP-5; made by KLA Tencor) was used to measure the number of defects present on the silicon wafer (this is defined as an initial value).

Next, by using the "CLEAN TRACK LITHIUS (product name)" made by Tokyo Electron Limited, each chemical liquid was rotationally applied onto the silicon wafer at 1500 rpm, and thereafter, the silicon wafer was spin-dried.

Next, the number of defects present on the silicon wafer after the application of the chemical liquid was measured (this is defined as a measurement value) by using the above surface inspection device. Next, the difference between the initial value and the measurement value (measurement value—initial value) was calculated and defined as the number of defects. The number of defects represents the amount of impurities in the chemical liquid remaining on the silicon wafer, and means that the smaller the numerical value, the smaller the amount of impurities in the chemical liquid.

The results are collectively shown in Table 1.

In addition, the above evaluation was performed in a clean room that satisfies the cleanliness of Class 2 or higher defined by the International Standard ISO 14644-1: 2015 established by the International Organization for Standardization.

In Table 1, the "Chemical Liquid" column represents a chemical liquid used in each example. For example, in Example 1, chemical liquids A1 to A20 containing nBA (butyl acetate) are used, and the amount of impurities differs between the chemical liquids A1 to A20.

The symbols of the chemical liquids in Table 1 represent the following chemical liquids.

nBA: Butyl acetate
MIBC: 4-methyl-2-pentanol
PGMEA: Propylene Glycol Monomethyl Ether Acetate
IPA: Isopropanol
CHN: Cyclohexanone

TABLE 1

| | Chemical liquid | | Quartz oscillator | Surface |
|---|---|---|---|---|
| | Type of organic solvent | No. | sensor evaluation (resonance frequency change amount (Hz)) | inspection device (number of defects) |
| Example 1 | nBA | A1 | 4668 | 10 |
| | | A2 | 5102 | 10 |
| | | A3 | 10411 | 43 |
| | | A4 | 15761 | 79 |
| | | A5 | 21253 | 86 |
| | | A6 | 24425 | 145 |
| | | A7 | 13352 | 123 |
| | | A8 | 3653 | 14 |
| | | A9 | 4912 | 59 |
| | | A10 | 5661 | 40 |
| | | A11 | 4294 | 19 |
| | | A12 | 8481 | 5 |
| | | A13 | 18246 | 79 |
| | | A14 | 18894 | 103 |
| | | A15 | 9628 | 67 |
| | | A16 | 3694 | 13 |
| | | A17 | 2578 | 14 |
| | | A18 | 53856 | 457 |
| | | A19 | 105569 | 890 |
| | | A20 | 55130 | 1025 |
| Example 2 | MIBC | B1 | 4823 | 6 |
| | | B2 | 8255 | 13 |
| | | B3 | 10954 | 179 |
| | | B4 | 6779 | 78 |
| | | B5 | 4139 | 5 |
| | | B6 | 6031 | 8 |
| | | B7 | 6245 | 18 |
| Example 3 | PGMEA | C1 | 5311 | 18 |
| | | C2 | 4688 | 11 |
| | | C3 | 3679 | 10 |
| | | C4 | 3450 | 5 |
| | | C5 | 23010 | 235 |
| Example 4 | IPA | D1 | 41065 | 489 |
| | | D2 | 21285 | 458 |
| | | D3 | 2756 | 2 |
| | | D4 | 2920 | 6 |
| | | D5 | 13297 | 5 |
| Example 5 | CHN | E1 | 23901 | 189 |
| | | E2 | 13426 | 131 |
| | | E3 | 10640 | 8 |
| | | E4 | 18649 | 154 |
| | | E5 | 10780 | 107 |
| | | E6 | 2849 | 6 |
| | | E7 | 1987 | 4 |

As shown in Table 1, there is a correlation between the amount of change in the resonance frequency and the number of defects, and in a case where the amount of change in the resonance frequency is large, the number of defects tends to increase.

Figure 11:
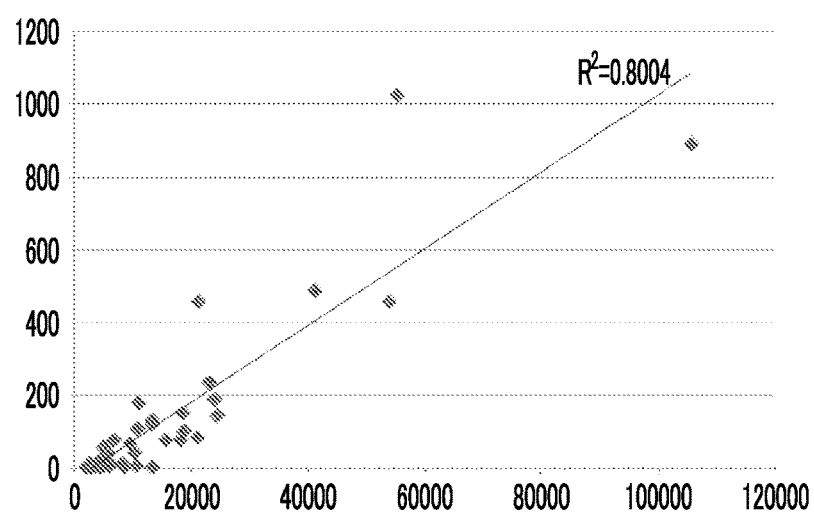
FIG. 11 is a graph in which the results of Example A are plotted on rectangular coordinates with the amount of change in resonance frequency on the horizontal axis and the number of defects on the vertical axis.

Additionally, as shown in FIG. 3, in a case where points for the amounts of change (crystal oscillator sensor evaluation (resonance frequency change amount (Hz))) in the resonance frequency of all the chemical liquids and the number of defects (surface inspection device evaluation (number of defects)) in Examples 1 to 5 were plotted on rectangular coordinates with the amount of change in the resonance frequency on the horizontal axis and the number of defects on the vertical axis, and a calibration curve passing through the plotted points was created by the least square method to calculate a determination coefficient ($R^2$) was calculated, the determination coefficient was calculated as 0.8004 (refer to FIG. 11). The closer the determination coefficient is to 1.000, the better the results, but the results in Table 1 show that the correlation between the amount of change in the resonance frequency and the number of defects is high.

Additionally, in a case where the [Evaluation using crystal oscillator sensor (1)] was carried out, the amount of change in the resonance frequency was measured according to the same procedure as in the above Examples 1 to 5 except that the evaluation was performed in a clean room that satisfies the cleanliness of Class 2 or higher defined by the International Standard ISO 14644-1: 2015 established by the International Organization for Standardization and the evaluation was performed by adjusting the temperature of the chemical liquid to 23° C.

Table 2 shows the obtained results of the amount of change in the resonance frequency and the [Evaluation using surface inspection device] obtained above.

TABLE 2

| | Chemical liquid | | Quartz oscillator sensor evaluation (resonance frequency change amount (Hz)) | Surface inspection device (number of defects) |
| --- | --- | --- | --- | --- |
| | Type of organic solvent | No. | | |
| Example 6 | nBA | A1 | 2013 | 10 |
| | nBA | A2 | 1655 | 10 |
| | nBA | A3 | 2447 | 43 |
| | nBA | A4 | 6963 | 79 |
| | nBA | A5 | 7798 | 86 |
| | nBA | A6 | 12456 | 145 |
| | nBA | A7 | 10970 | 123 |
| | nBA | A8 | 1382 | 14 |
| | nBA | A9 | 1271 | 59 |
| | nBA | A10 | 2641 | 40 |
| | nBA | A11 | 2020 | 19 |
| | nBA | A12 | 1273 | 5 |
| | nBA | A13 | 6207 | 79 |
| | nBA | A14 | 11039 | 103 |
| | nBA | A15 | 6855 | 67 |
| | nBA | A16 | 1773 | 13 |
| | nBA | A17 | 921 | 14 |
| | nBA | A18 | 24657 | 457 |
| | nBA | A19 | 52199 | 890 |
| | nBA | A20 | 52370 | 1025 |
| Example 7 | MIBC | B1 | 1760 | 6 |
| | MIBC | B2 | 2063 | 13 |
| | MIBC | B3 | 5192 | 179 |
| | MIBC | B4 | 4761 | 78 |
| | MIBC | B5 | 1017 | 5 |
| | MIBC | B6 | 2121 | 8 |
| | MIBC | B7 | 2910 | 18 |
| Example 8 | PGMEA | C1 | 2336 | 18 |
| | PGMEA | C2 | 1976 | 11 |
| | PGMEA | C3 | 1712 | 10 |
| | PGMEA | C4 | 967 | 5 |
| | PGMEA | C5 | 21483 | 235 |
| Example 9 | IPA | D1 | 20527 | 489 |
| | IPA | D2 | 19537 | 458 |
| | IPA | D3 | 748 | 2 |
| | IPA | D4 | 1007 | 6 |
| | IPA | D5 | 913 | 5 |
| Example 10 | CHN | E1 | 11384 | 189 |
| | CHN | E2 | 11517 | 131 |
| | CHN | E3 | 909 | 8 |
| | CHN | E4 | 8731 | 154 |
| | CHN | E5 | 8918 | 107 |
| | CHN | E6 | 862 | 6 |
| | CHN | E7 | 987 | 4 |

In a case where points for the amounts of change (crystal oscillator sensor evaluation (resonance frequency change amount (Hz))) in the resonance frequency of all the chemical liquids and the number of defects (surface inspection device evaluation (number of defects)) in Examples 6 to 10 were plotted on rectangular coordinates with the amount of change in the resonance frequency on the horizontal axis and the number of defects on the vertical axis, and a calibration curve passing through the plotted points was created by the least square method to calculate a determination coefficient ($R^2$) was calculated, the determination coefficient was calculated as 0.9626. The results in Table 2 were better than the results in Table 1.

Example B

According to the same procedure as in the above Example A, the chemical liquids (A21 to A40, B8 to B14, C6 to C10, D6 to D10, E8 to E14) used in the respective examples were prepared. In addition, the amount of impurities in each chemical liquid was different. For the impurity concentration in the chemical liquid, the peaks of all components of the chemical liquid except a main chemical liquid were obtained as integral values by LC/MS, and the concentration was obtained through n-hexane conversion.

[Evaluation Using Crystal Oscillator Sensor (2)]

The evaluation of the amount of change in the resonance frequency of the crystal oscillator was carried out by preparing a crystal oscillator sensor in which the adsorption layer shown in FIG. 2 is each layer (Si layer, $SiO_2$ layer, SiOC layer, Cu layer, Co layer, Ti layer, W layer, TiN layer, Ta layer, TaN layer) shown in Table 3 and bringing each chemical liquid (A21 to A40, B8 to B14, C6 to C10, D6 to D10, E8 to E14) into contact with the crystal oscillator sensor by using the measuring device (refer to FIG. 1) having the flow cell unit, shown in FIG. 4, having the above crystal oscillator sensor. Specifically, the temperature of the chemical liquid was adjusted by a temperature adjustment unit such that the temperature of the chemical liquid is 23° C., and the amount of change (Hz) in the resonance frequency of the crystal oscillator in a case where each chemical liquid was circulated in the flow cell unit at a circulation flow rate of 20 ml/s for 60 minutes was obtained. In addition, the resonance frequency of the crystal oscillator before being brought into contact with the chemical liquid was 27 MHz.

The results are collectively shown in Tables 3 to 7.

In addition, the above evaluation was performed in a clean room that satisfies the cleanliness of Class 2 or higher defined by the International Standard ISO 14644-1: 2015 established by the International Organization for Standardization.

Additionally, the liquid contact portions (the liquid contact portion of the block, the liquid contact portion of the seal portion, and the liquid contact portion of the liquid feeding unit) of the respective members of the flow cell unit in the resonance frequency measuring device are made of the same fluorine-based resin as in Example 24 described below.

[Evaluation Using Surface Inspection Device (2)]

First, various substrates (Si substrate, $SiO_2$ substrate, SiOC substrate, Cu substrate, Co substrate, Ti substrate, W substrate, TiN substrate, Ta substrate, and TaN substrate) were prepared.

Next, the surface inspection device (SP-5; made by KLA Tencor) on the wafer was used to measure the number of defects present on each substrate (this is defined as the initial value).

Next, by using the "CLEAN TRACK LITHIUS (product name)" made by Tokyo Electron Limited, each chemical liquid (A21 to A40, B8 to B14, C6 to C10, D6 to D10, E8 to E14) was rotated and applied onto the substrate at 1500 rpm, and thereafter, the substrate was spin-dried.

Next, the number of defects present on the substrate after the application of the chemical liquid was measured (this is defined as a measurement value) by using the above device (SP-5). Next, the difference between the initial value and the measurement value (measurement value—initial value) was calculated and defined as the number of defects.

The results are collectively shown in Tables 3 to 7.

In addition, the above evaluation was performed in a clean room that satisfies the cleanliness of Class 2 or higher defined by the International Standard ISO 14644-1: 2015 established by the International Organization for Standardization.

In Tables 3 to 7, the results using adsorption layers and substrates of the same metal types are shown side by side. For example, in the "Si" column in Table 3, the results of [Evaluation using crystal oscillator sensor (2)] using an "Si layer" as an adsorption layer and the results of the [Evaluation using surface inspection device (2)] using Si substrate] are shown.

TABLE 3

| | Chemical liquid | | Si | | $SiO_2$ | |
| | | | Quartz oscillator sensor evaluation (resonance | Surface inspection | Quartz oscillator sensor evaluation (resonance | Surface inspection |
| | Type of organic solvent | No. | frequency change amount (Hz)) | device (number of defects) | frequency change amount (Hz)) | device (number of defects) |
|---|---|---|---|---|---|---|
| Example 11 | nBA | A21 | 994 | 10 | 229 | 25 |
| | nBA | A22 | 1019 | 10 | 235 | 25 |
| | nBA | A23 | 636 | 8 | 147 | 20 |
| | nBA | A24 | 1811 | 23 | 418 | 57 |
| | nBA | A25 | 5152 | 86 | 1189 | 215 |
| | nBA | A26 | 2646 | 44 | 611 | 110 |
| | nBA | A27 | 9810 | 156 | 2264 | 390 |
| | nBA | A28 | 1159 | 14 | 268 | 36 |
| | nBA | A29 | 223 | 4 | 51 | 11 |
| | nBA | A30 | 5900 | 40 | 1362 | 100 |
| | nBA | A31 | 1593 | 19 | 368 | 48 |
| | nBA | A32 | 427 | 5 | 99 | 13 |
| | nBA | A33 | 846 | 10 | 195 | 26 |
| | nBA | A34 | 502 | 6 | 116 | 16 |
| | nBA | A35 | 1258 | 13 | 290 | 31 |
| | nBA | A36 | 805 | 8 | 186 | 20 |
| | nBA | A37 | 1431 | 18 | 330 | 45 |
| | nBA | A38 | 1157 | 14 | 267 | 36 |
| | nBA | A39 | 411 | 5 | 95 | 11 |
| | nBA | A40 | 487 | 5 | 112 | 14 |
| Example 12 | MIBC | B8 | 331 | 4 | 76 | 10 |
| | MIBC | B9 | 51868 | 1025 | 11969 | 2563 |
| | MIBC | B10 | 5361 | 63 | 1237 | 158 |
| | MIBC | B11 | 5678 | 67 | 1310 | 167 |
| | MIBC | B12 | 1177 | 13 | 272 | 33 |
| | MIBC | B13 | 595 | 7 | 137 | 17 |
| | MIBC | B14 | 326 | 6 | 75 | 14 |
| Example 13 | PGMEA | C6 | 4387 | 78 | 1012 | 195 |
| | PGMEA | C7 | 374 | 5 | 86 | 12 |
| | PGMEA | C8 | 643 | 8 | 148 | 21 |
| | PGMEA | C9 | 1479 | 18 | 341 | 45 |
| | PGMEA | C10 | 905 | 11 | 209 | 27 |
| Example 14 | IPA | D6 | 1071 | 10 | 247 | 24 |
| | IPA | D7 | 641 | 5 | 148 | 13 |
| | IPA | D8 | 326 | 4 | 75 | 11 |
| | IPA | D9 | 19371 | 358 | 4470 | 895 |
| | IPA | D10 | 167 | 2 | 38 | 6 |
| Example 15 | CHN | E8 | 582 | 6 | 134 | 16 |
| | CHN | E9 | 426 | 5 | 98 | 13 |
| | CHN | E10 | 10897 | 172 | 2515 | 430 |
| | CHN | E11 | 619 | 8 | 143 | 19 |
| | CHN | E12 | 290 | 3 | 67 | 8 |
| | CHN | E13 | 8442 | 145 | 1948 | 363 |
| | CHN | E14 | 476 | 6 | 110 | 15 |

TABLE 4

| | Chemical liquid | | SiOC | | Cu | |
|---|---|---|---|---|---|---|
| | Type of organic solvent | No. | Quartz oscillator sensor evaluation (resonance frequency change amount (Hz)) | Surface inspection device (number of defects) | Quartz oscillator sensor evaluation (resonance frequency change amount (Hz)) | Surface inspection device (number of defects) |
| Example 11 | nBA | A21 | 552 | 72 | 248 | 216 |
| | nBA | A22 | 566 | 74 | 255 | 222 |
| | nBA | A23 | 353 | 58 | 159 | 173 |
| | nBA | A24 | 1006 | 164 | 453 | 492 |
| | nBA | A25 | 2862 | 623 | 1288 | 1868 |
| | nBA | A26 | 1470 | 320 | 661 | 959 |
| | nBA | A27 | 5450 | 1131 | 2453 | 3393 |
| | nBA | A28 | 644 | 105 | 290 | 315 |
| | nBA | A29 | 124 | 32 | 56 | 97 |
| | nBA | A30 | 3278 | 290 | 1475 | 870 |
| | nBA | A31 | 885 | 139 | 398 | 417 |
| | nBA | A32 | 237 | 37 | 107 | 112 |
| | nBA | A33 | 470 | 76 | 212 | 227 |
| | nBA | A34 | 279 | 45 | 126 | 135 |
| | nBA | A35 | 699 | 91 | 314 | 274 |
| | nBA | A36 | 447 | 58 | 201 | 175 |
| | nBA | A37 | 795 | 130 | 358 | 389 |
| | nBA | A38 | 643 | 105 | 289 | 315 |
| | nBA | A39 | 228 | 33 | 103 | 99 |
| | nBA | A40 | 270 | 39 | 122 | 118 |
| Example 12 | MIBC | B8 | 184 | 29 | 83 | 87 |
| | MIBC | B9 | 28815 | 7431 | 12967 | 22294 |
| | MIBC | B10 | 2978 | 457 | 1340 | 1372 |
| | MIBC | B11 | 3154 | 484 | 1419 | 1453 |
| | MIBC | B12 | 654 | 95 | 294 | 285 |
| | MIBC | B13 | 331 | 48 | 149 | 144 |
| | MIBC | B14 | 181 | 42 | 82 | 126 |
| Example 13 | PGMEA | C6 | 2437 | 565 | 1097 | 1696 |
| | PGMEA | C7 | 208 | 35 | 94 | 105 |
| | PGMEA | C8 | 357 | 60 | 161 | 180 |
| | PGMEA | C9 | 821 | 129 | 370 | 387 |
| | PGMEA | C10 | 503 | 79 | 226 | 237 |
| Example 14 | IPA | D6 | 595 | 71 | 268 | 212 |
| | IPA | D7 | 356 | 39 | 160 | 117 |
| | IPA | D8 | 181 | 32 | 82 | 95 |
| | IPA | D9 | 10761 | 2596 | 4843 | 7787 |
| | IPA | D10 | 93 | 17 | 42 | 52 |
| Example 15 | CHN | E8 | 323 | 47 | 145 | 141 |
| | CHN | E9 | 237 | 37 | 106 | 112 |
| | CHN | E10 | 6054 | 1247 | 2724 | 3741 |
| | CHN | E11 | 344 | 56 | 155 | 168 |
| | CHN | E12 | 161 | 23 | 72 | 70 |
| | CHN | E13 | 4690 | 1051 | 2110 | 3154 |
| | CHN | E14 | 264 | 44 | 119 | 131 |

TABLE 5

| | Chemical liquid | | Co | | Ti | |
|---|---|---|---|---|---|---|
| | Type of organic solvent | No. | Quartz oscillator sensor evaluation (resonance frequency change amount (Hz)) | Surface inspection device (number of defects) | Quartz oscillator sensor evaluation (resonance frequency change amount (Hz)) | Surface inspection device (number of defects) |
| Example 11 | nBA | A21 | 284 | 205 | 248 | 400 |
| | nBA | A22 | 291 | 211 | 255 | 411 |
| | nBA | A23 | 182 | 164 | 159 | 320 |
| | nBA | A24 | 518 | 468 | 453 | 912 |
| | nBA | A25 | 1472 | 1774 | 1288 | 3460 |
| | nBA | A26 | 756 | 911 | 661 | 1777 |
| | nBA | A27 | 2803 | 3223 | 2453 | 6286 |
| | nBA | A28 | 331 | 299 | 290 | 584 |
| | nBA | A29 | 64 | 92 | 56 | 180 |
| | nBA | A30 | 1686 | 827 | 1475 | 1612 |

TABLE 5-continued

|  | Chemical liquid | | Co | | Ti | |
|---|---|---|---|---|---|---|
|  | Type of organic solvent | No. | Quartz oscillator sensor evaluation (resonance frequency change amount (Hz)) | Surface inspection device (number of defects) | Quartz oscillator sensor evaluation (resonance frequency change amount (Hz)) | Surface inspection device (number of defects) |
|  | nBA | A31 | 455 | 397 | 398 | 773 |
|  | nBA | A32 | 122 | 106 | 107 | 207 |
|  | nBA | A33 | 242 | 216 | 212 | 421 |
|  | nBA | A34 | 144 | 128 | 126 | 250 |
|  | nBA | A35 | 359 | 260 | 314 | 507 |
|  | nBA | A36 | 230 | 166 | 201 | 324 |
|  | nBA | A37 | 409 | 370 | 358 | 721 |
|  | nBA | A38 | 331 | 299 | 289 | 583 |
|  | nBA | A39 | 117 | 94 | 103 | 184 |
|  | nBA | A40 | 139 | 112 | 122 | 218 |
| Example 12 | MIBC | B8 | 95 | 82 | 83 | 161 |
|  | MIBC | B9 | 14819 | 21179 | 12967 | 41299 |
|  | MIBC | B10 | 1532 | 1303 | 1340 | 2541 |
|  | MIBC | B11 | 1622 | 1380 | 1419 | 2691 |
|  | MIBC | B12 | 336 | 270 | 294 | 527 |
|  | MIBC | B13 | 170 | 137 | 149 | 267 |
|  | MIBC | B14 | 93 | 120 | 82 | 234 |
| Example 13 | PGMEA | C6 | 1253 | 1612 | 1097 | 3142 |
|  | PGMEA | C7 | 107 | 99 | 94 | 194 |
|  | PGMEA | C8 | 184 | 171 | 161 | 333 |
|  | PGMEA | C9 | 422 | 368 | 370 | 718 |
|  | PGMEA | C10 | 258 | 225 | 226 | 439 |
| Example 14 | IPA | D6 | 306 | 201 | 268 | 392 |
|  | IPA | D7 | 183 | 112 | 160 | 217 |
|  | IPA | D8 | 93 | 90 | 82 | 175 |
|  | IPA | D9 | 5534 | 7397 | 4843 | 14424 |
|  | IPA | D10 | 48 | 49 | 42 | 96 |
| Example 15 | CHN | E8 | 166 | 134 | 145 | 260 |
|  | CHN | E9 | 122 | 106 | 106 | 207 |
|  | CHN | E10 | 3114 | 3554 | 2724 | 6930 |
|  | CHN | E11 | 177 | 160 | 155 | 312 |
|  | CHN | E12 | 83 | 67 | 72 | 130 |
|  | CHN | E13 | 2412 | 2996 | 2110 | 5842 |
|  | CHN | E14 | 136 | 125 | 119 | 244 |

TABLE 6

|  | Chemical liquid | | W | | TiN | |
|---|---|---|---|---|---|---|
|  | Type of organic solvent | No. | Quartz oscillator sensor evaluation (resonance frequency change amount (Hz)) | Surface inspection device (number of defects) | Quartz oscillator sensor evaluation (resonance frequency change amount (Hz)) | Surface inspection device (number of defects) |
| Example 11 | nBA | A21 | 259 | 601 | 346 | 481 |
|  | nBA | A22 | 266 | 616 | 354 | 493 |
|  | nBA | A23 | 166 | 481 | 221 | 384 |
|  | nBA | A24 | 473 | 1368 | 630 | 1095 |
|  | nBA | A25 | 1344 | 5190 | 1792 | 4152 |
|  | nBA | A26 | 690 | 2665 | 920 | 2132 |
|  | nBA | A27 | 2559 | 9428 | 3412 | 7543 |
|  | nBA | A28 | 302 | 876 | 403 | 701 |
|  | nBA | A29 | 58 | 270 | 78 | 216 |
|  | nBA | A30 | 1539 | 2418 | 2052 | 1934 |
|  | nBA | A31 | 416 | 1160 | 554 | 928 |
|  | nBA | A32 | 111 | 311 | 149 | 249 |
|  | nBA | A33 | 221 | 631 | 294 | 505 |
|  | nBA | A34 | 131 | 375 | 175 | 300 |
|  | nBA | A35 | 328 | 760 | 438 | 608 |
|  | nBA | A36 | 210 | 487 | 280 | 389 |
|  | nBA | A37 | 373 | 1081 | 498 | 865 |
|  | nBA | A38 | 302 | 874 | 402 | 699 |
|  | nBA | A39 | 107 | 276 | 143 | 221 |
|  | nBA | A40 | 127 | 327 | 169 | 261 |

TABLE 6-continued

|  |  |  | W | | TiN | |
| --- | --- | --- | --- | --- | --- | --- |
|  | Chemical liquid | | Quartz oscillator sensor evaluation (resonance frequency change amount (Hz)) | Surface inspection device (number of defects) | Quartz oscillator sensor evaluation (resonance frequency change amount (Hz)) | Surface inspection device (number of defects) |
|  | Type of organic solvent | No. | | | | |
| Example 12 | MIBC | B8 | 86 | 241 | 115 | 193 |
|  | MIBC | B9 | 13531 | 61949 | 18041 | 49559 |
|  | MIBC | B10 | 1399 | 3812 | 1865 | 3050 |
|  | MIBC | B11 | 1481 | 4037 | 1975 | 3230 |
|  | MIBC | B12 | 307 | 791 | 410 | 632 |
|  | MIBC | B13 | 155 | 400 | 207 | 320 |
|  | MIBC | B14 | 85 | 350 | 113 | 280 |
| Example 13 | PGMEA | C6 | 1144 | 4714 | 1526 | 3771 |
|  | PGMEA | C7 | 98 | 291 | 130 | 233 |
|  | PGMEA | C8 | 168 | 499 | 224 | 399 |
|  | PGMEA | C9 | 386 | 1077 | 514 | 861 |
|  | PGMEA | C10 | 236 | 659 | 315 | 527 |
| Example 14 | IPA | D6 | 279 | 588 | 373 | 471 |
|  | IPA | D7 | 167 | 326 | 223 | 261 |
|  | IPA | D8 | 85 | 263 | 113 | 210 |
|  | IPA | D9 | 5053 | 21637 | 6738 | 17309 |
|  | IPA | D10 | 43 | 144 | 58 | 115 |
| Example 15 | CHN | E8 | 152 | 391 | 202 | 312 |
|  | CHN | E9 | 111 | 310 | 148 | 248 |
|  | CHN | E10 | 2843 | 10395 | 3790 | 8316 |
|  | CHN | E11 | 162 | 468 | 215 | 374 |
|  | CHN | E12 | 76 | 195 | 101 | 156 |
|  | CHN | E13 | 2202 | 8763 | 2936 | 7011 |
|  | CHN | E14 | 124 | 365 | 166 | 292 |

TABLE 7

|  |  |  | Ta | | TaN | |
| --- | --- | --- | --- | --- | --- | --- |
|  | Chemical liquid | | Quartz oscillator sensor evaluation (resonance frequency change amount (Hz)) | Surface inspection device (number of defects) | Quartz oscillator sensor evaluation (resonance frequency change amount (Hz)) | Surface inspection device (number of defects) |
|  | Type of organic solvent | No. | | | | |
| Example 11 | nBA | A21 | 221 | 529 | 172 | 539 |
|  | nBA | A22 | 226 | 542 | 176 | 553 |
|  | nBA | A23 | 141 | 423 | 110 | 431 |
|  | nBA | A24 | 403 | 1204 | 313 | 1228 |
|  | nBA | A25 | 1145 | 4567 | 892 | 4658 |
|  | nBA | A26 | 588 | 2345 | 458 | 2392 |
|  | nBA | A27 | 2180 | 8297 | 1698 | 8463 |
|  | nBA | A28 | 258 | 771 | 201 | 786 |
|  | nBA | A29 | 50 | 237 | 39 | 242 |
|  | nBA | A30 | 1311 | 2127 | 1021 | 2170 |
|  | nBA | A31 | 354 | 1021 | 276 | 1041 |
|  | nBA | A32 | 95 | 274 | 74 | 279 |
|  | nBA | A33 | 188 | 556 | 146 | 567 |
|  | nBA | A34 | 112 | 330 | 87 | 336 |
|  | nBA | A35 | 280 | 669 | 218 | 682 |
|  | nBA | A36 | 179 | 428 | 139 | 437 |
|  | nBA | A37 | 318 | 951 | 248 | 970 |
|  | nBA | A38 | 257 | 769 | 200 | 784 |
|  | nBA | A39 | 91 | 243 | 71 | 248 |
|  | nBA | A40 | 108 | 288 | 84 | 293 |
| Example 12 | MIBC | B8 | 74 | 212 | 57 | 216 |
|  | MIBC | B9 | 11526 | 54515 | 8977 | 55605 |
|  | MIBC | B10 | 1191 | 3354 | 928 | 3422 |
|  | MIBC | B11 | 1262 | 3553 | 983 | 3624 |
|  | MIBC | B12 | 262 | 696 | 204 | 710 |
|  | MIBC | B13 | 132 | 352 | 103 | 359 |
|  | MIBC | B14 | 72 | 308 | 56 | 315 |
| Example 13 | PGMEA | C6 | 975 | 4148 | 759 | 4231 |
|  | PGMEA | C7 | 83 | 256 | 65 | 261 |
|  | PGMEA | C8 | 143 | 439 | 111 | 448 |

TABLE 7-continued

|  |  |  | Ta | | TaN | |
|---|---|---|---|---|---|---|
|  | Chemical liquid | | Quartz oscillator sensor evaluation (resonance | Surface inspection | Quartz oscillator sensor evaluation (resonance | Surface inspection |
|  | Type of organic solvent | No. | frequency change amount (Hz)) | device (number of defects) | frequency change amount (Hz)) | device (number of defects) |
|  | PGMEA | C9 | 329 | 947 | 256 | 966 |
|  | PGMEA | C10 | 201 | 580 | 157 | 591 |
| Example 14 | IPA | D6 | 238 | 518 | 185 | 528 |
|  | IPA | D7 | 142 | 287 | 111 | 293 |
|  | IPA | D8 | 72 | 231 | 56 | 236 |
|  | IPA | D9 | 4305 | 19040 | 3353 | 19421 |
|  | IPA | D10 | 37 | 127 | 29 | 129 |
| Example 15 | CHN | E8 | 129 | 344 | 101 | 351 |
|  | CHN | E9 | 95 | 273 | 74 | 278 |
|  | CHN | E10 | 2422 | 9148 | 1886 | 9331 |
|  | CHN | E11 | 138 | 412 | 107 | 420 |
|  | CHN | E12 | 64 | 171 | 50 | 175 |
|  | CHN | E13 | 1876 | 7712 | 1461 | 7866 |
|  | CHN | E14 | 106 | 322 | 82 | 328 |

As shown in the above tables, in a case where the adsorption layers and the substrates made of the same metal types were used, the amount of change in the resonance frequency and the number of defects have a high correlation, and in a case where the amount of change in the resonance frequency is large, the number of defects tended to increase.

Example C

The amount of change in the resonance frequency was measured according to the same procedure as in [Evaluation using crystal oscillator sensor (2)] except that a Au layer was used instead of the Si layer.

Next, the amount of change in the resonance frequency obtained by using the Au layer was subtracted from the amount of change in the resonance frequency obtained by using the Si layer, and the difference was obtained.

The results are shown in Table 8.

In Table 8, the "Si layer-Au layer" column represents the difference obtained by subtracting the "Crystal oscillator sensor evaluation" in the "Au layer" column (Resonance frequency change amount (Hz))"from the "Crystal oscillator sensor evaluation (resonance frequency change amount (Hz))" in the "Si layer" column.

TABLE 8

|  |  |  | Si layer | | Au layer | |
|---|---|---|---|---|---|---|
|  | Chemical liquid | | Quartz oscillator sensor evaluation (resonance | Surface inspection | Quartz oscillator sensor evaluation (resonance | Frequency- |
|  | Type of organic solvent | No. | frequency change amount (Hz)) | device (number of defects) | frequency change amount (Hz)) | Oscillation frequency Si layer-Au layer |
| Example 16 | nBA | A21 | 994 | 10 | 105 | 889 |
|  | nBA | A22 | 1019 | 10 | 140 | 879 |
|  | nBA | A23 | 636 | 8 | 8 | 628 |
|  | nBA | A24 | 1811 | 23 | 24 | 1787 |
|  | nBA | A25 | 5152 | 86 | 69 | 5083 |
|  | nBA | A26 | 2646 | 44 | 35 | 2610 |
|  | nBA | A27 | 9810 | 156 | 510 | 9300 |
|  | nBA | A28 | 1159 | 14 | 15 | 1144 |
|  | nBA | A29 | 223 | 4 | 3 | 220 |
|  | nBA | A30 | 5900 | 40 | 2669 | 3231 |
|  | nBA | A31 | 1593 | 19 | 21 | 1572 |
|  | nBA | A32 | 427 | 5 | 6 | 421 |
|  | nBA | A33 | 846 | 10 | 11 | 835 |
|  | nBA | A34 | 502 | 6 | 7 | 496 |
|  | nBA | A35 | 1258 | 13 | 17 | 1241 |
|  | nBA | A36 | 805 | 8 | 11 | 794 |
|  | nBA | A37 | 1431 | 18 | 19 | 1412 |
|  | nBA | A38 | 1157 | 14 | 15 | 1141 |
|  | nBA | A39 | 411 | 5 | 5 | 405 |
|  | nBA | A40 | 487 | 5 | 6 | 480 |
| Example 17 | MIBC | B8 | 331 | 4 | 4 | 326 |
|  | MIBC | B9 | 51868 | 1025 | 692 | 51176 |
|  | MIBC | B10 | 5361 | 63 | 71 | 5290 |
|  | MIBC | B11 | 5678 | 67 | 76 | 5602 |
|  | MIBC | B12 | 1177 | 13 | 190 | 987 |

TABLE 8-continued

|  | Chemical liquid | | Si layer | | Au layer | |
|---|---|---|---|---|---|---|
|  | Type of organic solvent | No. | Quartz oscillator sensor evaluation (resonance frequency change amount (Hz)) | Surface inspection device (number of defects) | Quartz oscillator sensor evaluation (resonance frequency change amount (Hz)) | Frequency- Oscillation frequency Si layer-Au layer |
|  | MIBC | B13 | 595 | 7 | 8 | 587 |
|  | MIBC | B14 | 326 | 6 | 4 | 322 |
| Example 18 | PGMEA | C6 | 4387 | 78 | 58 | 4329 |
|  | PGMEA | C7 | 374 | 5 | 5 | 369 |
|  | PGMEA | C8 | 643 | 8 | 9 | 634 |
|  | PGMEA | C9 | 1479 | 18 | 20 | 1459 |
|  | PGMEA | C10 | 905 | 11 | 12 | 893 |
| Example 19 | IPA | D6 | 1071 | 10 | 182 | 889 |
|  | IPA | D7 | 641 | 5 | 9 | 632 |
|  | IPA | D8 | 326 | 4 | 4 | 322 |
|  | IPA | D9 | 19371 | 358 | 471 | 18900 |
|  | IPA | D10 | 167 | 2 | 2 | 164 |
| Example 20 | CHN | E8 | 582 | 6 | 8 | 574 |
|  | CHN | E9 | 462 | 5 | 6 | 420 |
|  | CHN | E10 | 10897 | 172 | 876 | 10021 |
|  | CHN | E11 | 619 | 8 | 8 | 611 |
|  | CHN | E12 | 290 | 3 | 4 | 286 |
|  | CHN | E13 | 8442 | 145 | 113 | 8329 |
|  | CHN | E14 | 476 | 6 | 6 | 470 |

In a case where points for the amounts of change (crystal oscillator sensor evaluation (resonance frequency change amount (Hz))) in the resonance frequency of the "Si layer" column and the number of defects (surface inspection device evaluation (number of defects)) in Examples 16 to 20 were plotted on rectangular coordinates with the amount of change in the resonance frequency on the horizontal axis and the number of defects on the vertical axis, and a calibration curve passing through the plotted points was created by the least square method to calculate a determination coefficient ($R^2$) was calculated, the determination coefficient was calculated as 0.9915.

Additionally, in a case where the points for the difference in the amount of change in the resonance frequency in the "Si layer-Au layer" column in Examples 16 to 20 and the number of defects (surface inspection device evaluation (number of defects)) in the "Si layer" column were plotted, and a calibration curve passing through the plotted points was created by the least square method to calculate the determination coefficient ($R^2$), the determination coefficient was calculated as 0.996.

From the above results, it was confirmed that in a case where the Au layer was used as a reference, the amount of change in the resonance frequency and the number of defects have a higher correlation.

Example D

The chemical liquids (A41 to A140) used in the respective examples were prepared according to the same procedure as in Example A.

The evaluation of the amount of change in the resonance frequency of the crystal oscillator was carried out by preparing a crystal oscillator sensor in which the adsorption layer shown in FIG. 2 is an Si layer and bringing each chemical liquid (A41 to A140) into contact with the crystal oscillator sensor by using the measuring device (refer to FIG. 1) having the flow cell unit, shown in FIG. 4, having the above crystal oscillator sensor. Specifically, the temperature of the chemical liquid was adjusted by a temperature adjustment unit such that the temperature of the chemical liquid is 23° C., and the amount of change (Hz) in the resonance frequency of the crystal oscillator in a case where each chemical liquid was circulated in the flow cell unit at a circulation flow rate of 20 ml/s for 60 minutes was obtained. In addition, the resonance frequency of the crystal oscillator before being brought into contact with the chemical liquid was 27 MHz.

In addition, in the measuring device used, at least a part of the liquid contact portion was made of the fluorine-based resin.

Specifically, in a case of the liquid contact portion (the portion coming into contact with the target chemical liquid) of the block, shown in FIG. 4, of the flow cell unit is made of the perfluoroethylene propene copolymer (FEP, Tensile strength: 20 to 30 MPa, Shore D hardness: 60 to 65, Bending modulus: 0.55 to 0.67 GPa), the "flow cell" column in Tables 9 to 10 is marked as "Yes", and in a case where the liquid contact portion is not made of the fluorine-based resin, the column is marked as "-".

Additionally, in a case where the liquid contact portion (the portion coming into contact with the target chemical liquid) of the liquid feeding unit is made of the THV soft fluororesin, the "liquid feeding unit" column in Tables 9 to 10 is marked as "Yes", and in a case where the liquid contact portion is not made of the fluorine-based resin, the column is marked as "-".

Additionally, in a case where the liquid contact portion (the portion coming into contact with the target chemical liquid) of the seal portion, shown in FIG. 4, which holds the target chemical liquid in the region, is made of polyvinylidene fluoride (PVDF, Tensile strength: 30 to 60 MPa, Shore D hardness: 64 to 79), the "seal portion A" column in Tables 9 to 10 is marked as "Yes", and in a case where the liquid contact portion is not made of the above-described fluorine-based resin, the column is marked as "-".

Moreover, in a case where the liquid contact portion (the portion coming into contact with the target chemical liquid) of the seal portion, shown in FIG. 4, which holds the target chemical liquid in the region, is made of perfluoroalkoxyalkane (PFA, Tensile strength: 25 to 35 MPa, Shore D hardness: 62 to 66), the "Seal portion B" column in Tables 9 to 10 is marked as "Yes", and in a case where the liquid contact portion of the seal portion is not made of the fluorine-based resin, the column is marked as "-".

Additionally, in a case where the amount of change in the resonance frequency was measured, the amount of impurities eluted from the measuring device into the target chemical liquid was measured using LC/MS (Thermo LC/MS QE plus).

TABLE 9

| | Chemical liquid | | | | | | Amount of | Quartz oscillator sensor evaluation (resonance | Surface inspection |
| | Type of organic solvent | No. | Flow cell | Liquid feeding unit | Sealing portion A | Sealing portion B | elution of impurities (ppt) | frequency change amount (Hz)) | device (number of defects) |
|---|---|---|---|---|---|---|---|---|---|
| Example 21 | nBA | A41 | Yes | — | — | — | 810 | 4668 | 10 |
| | | A42 | Yes | — | — | — | 810 | 5102 | 10 |
| | | A43 | Yes | — | — | — | 810 | 12411 | 43 |
| | | A44 | Yes | — | — | — | 810 | 15761 | 79 |
| | | A45 | Yes | — | — | — | 810 | 21253 | 86 |
| | | A46 | Yes | — | — | — | 810 | 24425 | 145 |
| | | A47 | Yes | — | — | — | 810 | 13352 | 123 |
| | | A48 | Yes | — | — | — | 810 | 3653 | 14 |
| | | A49 | Yes | — | — | — | 810 | 7912 | 59 |
| | | A50 | Yes | — | — | — | 810 | 5661 | 40 |
| | | A51 | Yes | — | — | — | 810 | 8994 | 19 |
| | | A52 | Yes | — | — | — | 810 | 8481 | 5 |
| | | A53 | Yes | — | — | — | 810 | 18246 | 79 |
| | | A54 | Yes | — | — | — | 810 | 18894 | 103 |
| | | A55 | Yes | — | — | — | 810 | 9628 | 67 |
| | | A56 | Yes | — | — | — | 810 | 3694 | 13 |
| | | A57 | Yes | — | — | — | 810 | 2578 | 14 |
| | | A58 | Yes | — | — | — | 810 | 63856 | 457 |
| | | A59 | Yes | — | — | — | 810 | 115569 | 890 |
| | | A60 | Yes | — | — | — | 810 | 48130 | 1025 |
| Example 22 | nBA | A61 | Yes | Yes | — | — | 650 | 4668 | 10 |
| | | A62 | Yes | Yes | — | — | 650 | 5102 | 10 |
| | | A63 | Yes | Yes | — | — | 650 | 10411 | 43 |
| | | A64 | Yes | Yes | — | — | 650 | 15761 | 79 |
| | | A65 | Yes | Yes | — | — | 650 | 21253 | 86 |
| | | A66 | Yes | Yes | — | — | 650 | 24425 | 145 |
| | | A67 | Yes | Yes | — | — | 650 | 13352 | 123 |
| | | A68 | Yes | Yes | — | — | 650 | 3653 | 14 |
| | | A69 | Yes | Yes | — | — | 650 | 4912 | 59 |
| | | A70 | Yes | Yes | — | — | 650 | 5661 | 40 |
| | | A71 | Yes | Yes | — | — | 650 | 4294 | 19 |
| | | A72 | Yes | Yes | — | — | 650 | 8481 | 5 |
| | | A73 | Yes | Yes | — | — | 650 | 18246 | 79 |
| | | A74 | Yes | Yes | — | — | 650 | 18894 | 103 |
| | | A75 | Yes | Yes | — | — | 650 | 9628 | 67 |
| | | A76 | Yes | Yes | — | — | 650 | 3694 | 13 |
| | | A77 | Yes | Yes | — | — | 650 | 2578 | 14 |
| | | A78 | Yes | Yes | — | — | 650 | 53856 | 457 |
| | | A79 | Yes | Yes | — | — | 650 | 105569 | 890 |
| | | A80 | Yes | Yes | — | — | 650 | 55130 | 1025 |
| Example 23 | nBA | A81 | Yes | Yes | Yes | — | 310 | 2013 | 10 |
| | | A82 | Yes | Yes | Yes | — | 310 | 1655 | 10 |
| | | A83 | Yes | Yes | Yes | — | 310 | 2447 | 8 |
| | | A84 | Yes | Yes | Yes | — | 310 | 6963 | 79 |
| | | A85 | Yes | Yes | Yes | — | 310 | 7798 | 86 |
| | | A86 | Yes | Yes | Yes | — | 310 | 12456 | 145 |
| | | A87 | Yes | Yes | Yes | — | 310 | 10970 | 123 |
| | | A88 | Yes | Yes | Yes | — | 310 | 1382 | 14 |
| | | A89 | Yes | Yes | Yes | — | 310 | 1271 | 4 |
| | | A90 | Yes | Yes | Yes | — | 310 | 2641 | 40 |
| | | A91 | Yes | Yes | Yes | — | 310 | 2020 | 19 |
| | | A92 | Yes | Yes | Yes | — | 310 | 1273 | 5 |
| | | A93 | Yes | Yes | Yes | — | 310 | 6207 | 79 |
| | | A94 | Yes | Yes | Yes | — | 310 | 11039 | 103 |
| | | A95 | Yes | Yes | Yes | — | 310 | 6855 | 67 |
| | | A96 | Yes | Yes | Yes | — | 310 | 1773 | 13 |
| | | A97 | Yes | Yes | Yes | — | 310 | 921 | 7 |
| | | A98 | Yes | Yes | Yes | — | 310 | 657 | 6 |
| | | A99 | Yes | Yes | Yes | — | 310 | 52199 | 890 |
| | | A100 | Yes | Yes | Yes | — | 310 | 52370 | 1025 |

TABLE 10

| | Chemical liquid | | Flow cell | Liquid feeding unit | Sealing portion A | Sealing portion B | Amount of elution of impurities (ppt) | Quartz oscillator sensor evaluation (resonance frequency change amount (Hz)) | Surface inspection device (number of defects) |
|---|---|---|---|---|---|---|---|---|---|
| | Type of organic solvent | No. | | | | | | | |
| Example 24 | nBA | A101 | Yes | Yes | — | Yes | <50 | 994 | 10 |
| | | A102 | Yes | Yes | — | Yes | <50 | 1019 | 10 |
| | | A103 | Yes | Yes | — | Yes | <50 | 636 | 8 |
| | | A104 | Yes | Yes | — | Yes | <50 | 1811 | 23 |
| | | A105 | Yes | Yes | — | Yes | <50 | 5152 | 86 |
| | | A106 | Yes | Yes | — | Yes | <50 | 2646 | 44 |
| | | A107 | Yes | Yes | — | Yes | <50 | 9810 | 156 |
| | | A108 | Yes | Yes | — | Yes | <50 | 1159 | 14 |
| | | A109 | Yes | Yes | — | Yes | <50 | 223 | 4 |
| | | A110 | Yes | Yes | — | Yes | <50 | 2950 | 40 |
| | | A111 | Yes | Yes | — | Yes | <50 | 1593 | 19 |
| | | A112 | Yes | Yes | — | Yes | <50 | 427 | 5 |
| | | A113 | Yes | Yes | — | Yes | <50 | 846 | 10 |
| | | A114 | Yes | Yes | — | Yes | <50 | 502 | 6 |
| | | A115 | Yes | Yes | — | Yes | <50 | 1258 | 13 |
| | | A116 | Yes | Yes | — | Yes | <50 | 805 | 8 |
| | | A117 | Yes | Yes | — | Yes | <50 | 1431 | 18 |
| | | A118 | Yes | Yes | — | Yes | <50 | 1157 | 14 |
| | | A119 | Yes | Yes | — | Yes | <50 | 411 | 5 |
| | | A120 | Yes | Yes | — | Yes | <50 | 487 | 5 |
| Example 25 | nBA | A121 | — | — | — | — | 1280 | 15680 | 10 |
| | | A122 | — | — | — | — | 1280 | 2475 | 10 |
| | | A123 | — | — | — | — | 1280 | 12411 | 43 |
| | | A124 | — | — | — | — | 1280 | 15761 | 79 |
| | | A125 | — | — | — | — | 1280 | 21253 | 86 |
| | | A126 | — | — | — | — | 1280 | 9102 | 145 |
| | | A127 | — | — | — | — | 1280 | 28970 | 123 |
| | | A128 | — | — | — | — | 1280 | 3653 | 14 |
| | | A129 | — | — | — | — | 1280 | 2179 | 59 |
| | | A130 | — | — | — | — | 1280 | 5661 | 40 |
| | | A131 | — | — | — | — | 1280 | 8994 | 19 |
| | | A132 | — | — | — | — | 1280 | 8481 | 5 |
| | | A133 | — | — | — | — | 1280 | 18246 | 79 |
| | | A134 | — | — | — | — | 1280 | 6789 | 103 |
| | | A135 | — | — | — | — | 1280 | 9628 | 67 |
| | | A136 | — | — | — | — | 1280 | 3694 | 13 |
| | | A137 | — | — | — | — | 1280 | 2578 | 14 |
| | | A138 | — | — | — | — | 1280 | 105789 | 457 |
| | | A139 | — | — | — | — | 1280 | 56790 | 890 |
| | | A140 | — | — | — | — | 1280 | 24379 | 1025 |

As shown in the above Tables 9 and 10, in Examples 21 to 24 in which at least a part of the liquid contact portion with the target chemical liquid in the measuring device is made of the fluorine-based resin, it was confirmed that, compared to Example 25 in where the fluorine-based resin is not used, the amount of impurities eluted from the measuring device is smaller, and as a result, the correlation between the amount of change in the resonance frequency and the number of defects is higher.

In a case where points for the amounts of change (crystal oscillator sensor evaluation (resonance frequency change amount (Hz))) in the resonance frequency and the number of defects (surface inspection device evaluation (number of defects)) in Example 21 were plotted on rectangular coordinates with the amount of change in the resonance frequency on the horizontal axis and the number of defects on the vertical axis, and a calibration curve passing through the plotted points was created by the least square method to calculate a determination coefficient ($R^2$) was calculated, the determination coefficient was calculated as 0.7318. In a case where the determination coefficients were calculated for Examples 22 to 25, the determination coefficients were 0.8086, 0.9843, 0.9936, and 0.3297, respectively. From this result, it was confirmed that the correlation between Examples 21 to 24, in which at least a part of the liquid contact portion of the measuring device is made of the fluorine-based resin, shows a better correlation than that of Example 25 in which the liquid contact portion of the measuring device is not made of the fluorine-based resin.

In Example 23, in a case where the resin constituting the liquid contact portion (the portion coming into contact with the target chemical liquid) of the block, shown in FIG. 4, of the flow cell unit is changed from the perfluoroethylene propene copolymer to the perfluoroalkoxyalkane, the ethylene tetrafluoroethylene copolymer, the perfluoroethylene propene copolymer, the polychlorotrifluoroethylene, or the polyvinylidene fluoride, it was confirmed that all show a correlation exceeding a correlation coefficient of 0.95. However, these results were slightly inferior to the result (0.984) of Example 23.

Additionally, in Example 23, in a case where the resin constituting the liquid contact portion (the portion coming into contact with the target chemical liquid) of the liquid feeding unit is changed from the THV soft fluororesin to the polyvinylidene fluoride, the ethylene tetrafluoroethylene copolymer, or the polychlorotrifluoroethylene, it was confirmed that all show a correlation exceeding a correlation coefficient of 0.95. However, these results were slightly inferior to the result (0.984) of Example 23.

Additionally, in Example 23, in a case where the resin constituting the liquid contact portion (the portion coming into contact with the target chemical liquid) of the seal portion, shown in FIG. 4, which holds the target chemical liquid in the region is changed from the polyvinylidene fluoride to the perfluoroethylene propene copolymer, the ethylene chlorotrifluoroethylene copolymer, the ethylene tetrafluoroethylene copolymer, or the polychlorotrifluoroethylene, it was confirmed that all show a correlation exceeding a correlation coefficient of 0.95. However, these results were slightly inferior to the result (0.984) of Example 23.

Additionally, in Example 23, in a case where any of the resin constituting the liquid contact portion (the portion coming into contact with the target chemical liquid) of the block, shown in FIG. 4, of the flow cell unit, the resin constituting the liquid contact portion (the portion coming into contact with the target chemical liquid) of the liquid feeding unit, and the resin constituting the liquid contact portion (the portion coming into contact with the target chemical liquid) of the seal portion, shown in FIG. 4, which holds the target chemical liquid in the region, is changed to the polytetrafluoroethylene, a value having a correlation coefficient larger than 0.85 and less than 0.95 value was obtained. From these results, it was confirmed that a better effect can be obtained in a case where the resin is used as the resin constituting the liquid contact portion with a fluorine-based resin other than the above-described polytetrafluoroethylene.

In addition, in a case where all the resin constituting the liquid contact portion (the portion coming into contact with the target chemical liquid) of the block, shown in FIG. 4, of the flow cell unit, the resin constituting the liquid contact portion (the portion coming into contact with the target chemical liquid) of the liquid feeding unit, and the resin constituting the liquid contact portion (the portion coming into contact with the target chemical liquid) of the seal portion, shown in FIG. 4, that holds the target chemical liquid in the region are the polytetrafluoroethylene, the correlation coefficient is superior to that of Example 22 but was equal to or less than 0.85.

Example E

[Production of Chemical Liquids]

nBA of high-purity grade having a purity of 99% by mass or more was purchased, and the following filters were appropriately combined with each other and subjected to the filtration treatment to prepare two types of chemical liquids (chemical liquid X and chemical liquid Y) having different amounts of impurities.

IEX-PTFE (15 nm): 15 nm IEX PTFE made by Entegris.
PTEE (12 nm): 12 nm PTFE made by Entegris.
UPE (3 nm): 3 nm PE filter made by Entegris.

Next, a case where the amount of change in the resonance frequency is equal to or less than 2000 Hz was set as a permissible range from the rectangular coordinates data with the amount of change in the resonance frequency obtained from the results of the amount of change in the resonance frequency (crystal oscillator sensor evaluation (resonance frequency change amount (Hz))) and the number of defects (surface inspection device evaluation (number of defects)) in Example 24 of the above <Example D> on the horizontal axis and the number of defects on the vertical axis.

Next, the "Crystal oscillator sensor evaluation (resonance frequency change amount (Hz))" was obtained according to the same procedure as in Example 24 by using the chemical liquid X and the chemical liquid Y.

After that, in a case where the permissible range (2000 Hz or less) of the amount of change in the resonance frequency preset above was set in the memory of the measuring device, and whether the amount of change in the resonance frequency obtained by using the chemical liquid X and the chemical liquid Y is within the permissible range was determined by the calculation unit, the chemical liquid X is within the permissible range, and the chemical liquid Y is out of the permissible range.

In a case where the [Evaluation using surface inspection device (1)] carried out in <Example A> was carried out using the chemical liquid X and the chemical liquid Y, it was confirmed that the number of defects in the chemical liquid X is about 20 or less, and the number of defects is small, whereas the number of defects in the chemical liquid Y is more than 20, and the number of defects is large. From this result, it was confirmed that the purity of the chemical liquid can be managed by measuring the amount of change in the resonance frequency of the chemical liquid.

Explanation of References

10: measuring device
12: flow cell unit
14: oscillation unit
14a: first oscillation unit
14b: second oscillation unit
15: detection unit
16: calculation unit
20: supply unit
18: memory
22: control unit
26: crystal oscillator sensor
27: crystal oscillator
27a: front surface
27b: back surface
28: temperature adjustment unit
29a: first tube
29b: second tube
30: electrode
30a: surface
31: electrode
34: adsorption layer
40: block
40a: supply passage
40b: discharge passage
40c, 42a: face
42, 43: seal portion
44: region
45: region
50: first electrode
51: second electrode
52: electrode
52a: first electrode portion
52b: second electrode portion
52c: connecting portion
60: set
62: chemical liquid
64: container
64a: inside
64b: side surface
64c: upper surface
66: information display unit

What is claimed is:

1. A management method of managing a purity of a chemical liquid containing an organic solvent by sensing impurities in the chemical liquid, the management method comprising:
   Step 1 of preparing a target chemical liquid containing an organic solvent;
   Step 2 of bringing the target chemical liquid into contact with a crystal oscillator sensor including an adsorption layer that adsorbs the impurities and a crystal oscillator and obtaining an amount of change in a resonance frequency of the crystal oscillator resulting from contact of the target chemical liquid; and
   Step 3 of managing the purity of the chemical liquid by comparing whether or not the obtained amount of change in the resonance frequency falls within a permissible range of the amount of change in the resonance frequency based on a preset purity of the target chemical liquid,
   wherein in Step 2, at least a part of a liquid contact portion coming into contact with the target chemical liquid is made of a fluorine-based resin.

2. The management method according to claim 1,
   wherein the target chemical liquid is fed to the crystal oscillator sensor to bring the target chemical liquid into contact with the crystal oscillator sensor.

3. The management method according to claim 1,
   wherein the target chemical liquid is allowed to flow in one direction through the crystal oscillator sensor to bring the target chemical liquid into contact with the crystal oscillator sensor.

4. The management method according to claim 1,
   wherein the target chemical liquid is circulated and supplied to the crystal oscillator sensor, and a circulation flow rate of the target chemical liquid is 0.01 to 1000 ml/s.

5. The management method according to claim 1,
   wherein the adsorption layer is made of at least one material of Si, Au, $SiO_2$, SiOC, Cu, Co, W, Ti, TiN, Ta, TaN, or a photosensitive resin composition.

6. The management method according to claim 1,
   wherein the crystal oscillator sensor has a plurality of the adsorption layers,
   Step 2 is a step of obtaining the amount of change in the resonance frequency for each of the plurality of adsorption layers, and
   Step 3 is a step of calculating a difference in the amount of change in the resonance frequency of each of the plurality of adsorption layers and managing the purity of the chemical liquid by comparing whether or not the obtained value falls within the permissible range of the amount of change in the resonance frequency based on the preset purity of the target chemical liquid.

7. The management method according to claim 6,
   wherein at least one of the plurality of adsorption layers is a Au layer.

8. A measuring method for a chemical liquid, comprising:
   Step 1 of preparing a target chemical liquid containing an organic solvent; and
   Step 2 of bringing the target chemical liquid into contact with a crystal oscillator sensor including an adsorption layer that adsorbs impurities in the target chemical liquid and a crystal oscillator and obtaining an amount of change in a resonance frequency of the crystal oscillator resulting from contact of the target chemical liquid,
   wherein in Step 2, at least a part of a liquid contact portion coming into contact with the target chemical liquid is made of a fluorine-based resin.

9. The measuring method according to claim 8,
   wherein the target chemical liquid is fed to the crystal oscillator sensor to bring the target chemical liquid into contact with the crystal oscillator sensor.

10. The measuring method according to claim 8,
    wherein the target chemical liquid is allowed to flow in one direction through the crystal oscillator sensor to bring the target chemical liquid into contact with the crystal oscillator sensor.

11. The measuring method according to claim 8,
    wherein the target chemical liquid is circulated and supplied to the crystal oscillator sensor, and a circulation flow rate of the target chemical liquid is 0.01 to 1000 ml/s.

12. The measuring method according to claim 8,
    wherein the adsorption layer is made of at least one material of Si, Au, $SiO_2$, SiOC, Cu, Co, W, Ti, TiN, Ta, TaN, or a photosensitive resin composition.

13. The measuring method according to claim 8,
    wherein the crystal oscillator sensor has a plurality of the adsorption layers, and
    Step 2 is a step of obtaining the amount of change in the resonance frequency for each of the plurality of the adsorption layers.

14. The measuring method according to claim 13,
    wherein at least one of the plurality of adsorption layers is a Au layer.

15. A measuring device that senses impurities in a chemical liquid containing an organic solvent, the measuring device comprising:
    a crystal oscillator sensor that is brought into contact with a target chemical liquid containing the organic solvent and includes an adsorption layer that adsorbs the impurities and a crystal oscillator;
    an oscillation unit that oscillates the crystal oscillator at a resonance frequency;
    a detection unit that is connected to the crystal oscillator sensor and detects the amount of change in the resonance frequency of the crystal oscillator resulting from contact with the target chemical liquid; and
    a supply unit that supplies the target chemical liquid to the crystal oscillator sensor and brings the target chemical liquid into contact with the crystal oscillator sensor,
    wherein at least a part of a liquid contact portion coming into contact with the target chemical liquid is made of a fluorine-based resin.

16. The measuring device according to claim 15, further comprising:
    a display unit that displays the amount of change in the resonance frequency.

17. The measuring device according to claim 15,
    wherein the supply unit allows the target chemical liquid to flow in one direction through the crystal oscillator sensor to supply the target chemical liquid.

18. The measuring device according to claim 15,
    wherein the supply unit circulates and supplies the target chemical liquid to the crystal oscillator sensor, and a circulation flow rate of the target chemical liquid is 0.01 to 1000 ml/s.

19. The measuring device according to claim 15,
    wherein the adsorption layer is made of at least one material of Si, Au, $SiO_2$, SiOC, Cu, Co, W, Ti, TiN, Ta, TaN, or a photosensitive resin composition.

20. The measuring device according to claim 15,
wherein the crystal oscillator sensor has a plurality of the adsorption layers, and the detection unit detects the amount of change in the resonance frequency for each of the plurality of the adsorption layers.

21. The measuring device according to claim 20,
wherein at least one of the plurality of adsorption layers is a Au layer.

22. The measuring device according to claim 15, further comprising:
a seal portion that is disposed on the crystal oscillator sensor;
a block that is disposed on the crystal oscillator sensor via the seal portion and is provided with a supply passage that supplies the target chemical liquid to the crystal oscillator sensor, and a discharge passage that discharges the target chemical liquid from the crystal oscillator sensor; and
a liquid feeding unit including a first tube connected to the supply passage and a second tube connected to the discharge passage,
wherein at least one of a liquid contact portion of the seal portion coming into contact with the target chemical liquid, a liquid contact portion of the block coming into contact with the target chemical liquid, or a liquid contact portion of the liquid feeding unit coming into contact with the target chemical liquid is made of a fluorine-based resin.

23. The measuring device according to claim 22,
wherein the liquid contact portion of the block coming into contact with the target chemical liquid is made of a fluorine-based resin showing a tensile strength of 20 to 60 MPa and a Shore D hardness of 60 to 80.

24. The measuring device according to claim 22,
wherein the liquid contact portion of the block coming into contact with the target chemical liquid is made of a fluorine-based resin selected from the group consisting of perfluoroalkoxyalkane, an ethylene tetrafluoro ethylene copolymer, a perfluoroethylene propene copolymer, polychlorotrifluoroethylene, and polyvinylidene fluoride.

25. The measuring device according to claim 22,
wherein the liquid contact portion of the liquid feeding unit coming into contact with the target chemical liquid is made of a fluorine-based resin having a repeating unit containing a fluorine atom, a carbon atom, and an atom other than the fluorine atom and the carbon atom.

26. The measuring device according to claim 22,
wherein the liquid contact portion of the liquid feeding unit coming into contact with the target chemical liquid is made of a fluorine-based resin selected from the group consisting of a ternary copolymer of tetrafluoroethylene, hexafluoropropylene, and vinylidene fluoride, polyvinylidene fluoride, an ethylene tetrafluoro ethylene copolymer, and polychlorotrifluoroethylene.

27. The measuring device according to claim 22,
wherein the liquid contact portion of the seal portion coming into contact with the target chemical liquid is made of a fluorine-based resin showing a tensile strength of 20 to 40 MPa, a Shore D hardness of 56 to 70, and a bending modulus of 0.5 to 3 GPa.

28. The measuring device according to claim 22,
wherein the liquid contact portion of the seal portion coming into contact with the target chemical liquid is made of a fluorine-based resin selected from the group consisting of perfluoroalkoxyalkane, a perfluoro ethylene propene copolymer, an ethylene chlorotrifluoroethylene copolymer, an ethylene tetrafluoroethylene copolymer, polychlorotrifluoroethylene, and polyvinylidene fluoride.

29. The crystal oscillator sensor used for the measuring device according to claim 15,
comprising the crystal oscillator; and
the adsorption layer disposed on the crystal oscillator,
wherein the adsorption layer is made of at least one material of Si, Au, $SiO_2$, SiOC, Cu, Co, W, Ti, TiN, Ta, TaN, or a photosensitive resin composition.

30. The crystal oscillator sensor according to claim 29,
wherein at least two adsorption layers are disposed on the crystal oscillator.

31. The crystal oscillator sensor according to claim 30,
wherein at least one of a plurality of the adsorption layers is a Au layer.

32. A set comprising:
a chemical liquid; and
an information display unit that displays or stores resonance frequency information of the chemical liquid,
wherein an amount of change in a resonance frequency of a crystal oscillator resulting from bringing the chemical liquid into contact with a crystal oscillator sensor including an adsorption layer that adsorbs impurities in the chemical liquid and the crystal oscillator is obtained, the obtained amount of change in the resonance frequency is compared with an amount of change in the resonance frequency based on a preset purity of the chemical liquid, an evaluation of the purity of the chemical liquid with respect to the obtained amount of change in the resonance frequency is given, and the obtained amount of change in the resonance frequency and the purity of the chemical liquid, which are based on the evaluation, are associated with each other and recorded as the resonance frequency information of the chemical liquid, and
the resonance frequency information of the chemical liquid is used to obtain information on the purity of the chemical liquid.

33. The set according to claim 32
wherein the set has a container that stores the chemical liquid, and the information display unit is provided in the container.

34. The set according to claim 32,
wherein the resonance frequency information of the chemical liquid is displayed on the information display unit by using at least one of texts, symbols, or barcodes.

* * * * *